United States Patent
Naito et al.

(10) Patent No.: US 10,358,379 B2
(45) Date of Patent: Jul. 23, 2019

(54) HEAT-INSULATING MEMBER, LOW-MELTING GLASS COMPOSITION, AND SEALING MATERIAL PASTE

(71) Applicant: HITACHI CHEMICAL COMPANY, LTD., Tokyo (JP)

(72) Inventors: Takashi Naito, Tokyo (JP); Shinichi Tachizono, Tokyo (JP); Kei Yoshimura, Tokyo (JP); Yuji Hashiba, Tokyo (JP); Takuya Aoyagi, Tokyo (JP); Motomune Kodama, Tokyo (JP); Taigo Onodera, Tokyo (JP); Tadashi Fujieda, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 263 days.

(21) Appl. No.: 15/036,721

(22) PCT Filed: Nov. 28, 2014

(86) PCT No.: PCT/JP2014/081537
§ 371 (c)(1),
(2) Date: May 13, 2016

(87) PCT Pub. No.: WO2015/087718
PCT Pub. Date: Jun. 18, 2015

(65) Prior Publication Data
US 2016/0297706 A1    Oct. 13, 2016

(30) Foreign Application Priority Data

Dec. 11, 2013    (JP) .................................. 2013-255575

(51) Int. Cl.
*C03C 8/24*      (2006.01)
*E06B 3/66*      (2006.01)
(Continued)

(52) U.S. Cl.
CPC .............. *C03C 8/24* (2013.01); *C03C 3/0745* (2013.01); *C03C 3/145* (2013.01); *C03C 3/16* (2013.01);
(Continued)

(58) Field of Classification Search
CPC ....... E06B 3/6612; E06B 3/6715; C03C 3/21; C03C 3/16; C03C 3/145; C03C 3/0745;
(Continued)

(56) References Cited

U.S. PATENT DOCUMENTS 4,683,154 A * 7/1987 Benson ................. C03B 23/245
428/34
8,075,961 B2   12/2011 Sawai et al.
(Continued)

FOREIGN PATENT DOCUMENTS

JP       03-127630 A      5/1991
JP       2002080247 A     3/2002
(Continued)

OTHER PUBLICATIONS

Machine translation of applicant cited JP 03-127630.*
(Continued)

*Primary Examiner* — Donald J Loney
(74) *Attorney, Agent, or Firm* — Volpe and Koenig, P.C.

(57) ABSTRACT

There is disclosed a heat-insulating member including a pair of substrates and an airtight sealing part, in which the airtight sealing part is formed in an outer peripheral part between the pair of substrates to form a space between the pair of substrates, the space being in a vacuum or reduced pressure state, a sealing material that forms the airtight sealing part includes a low-melting glass, and the low-melting glass contains a vanadium oxide, barium oxide, phosphorus oxide, and tungsten oxide, in which the following two relational expressions are satisfied in terms of oxide (Continued)

contents: $V_2O_5+BaO+P_2O_5+WO_3 \geq 90$ and $V_2O_5 > BaO > P_2O_5 > WO_3$ (wherein unit: mol %). Thereby, influence on environmental impact can be reduced and maintenance of airtightness and an improvement in acid resistance can be achieved.

21 Claims, 15 Drawing Sheets

(51) Int. Cl.
- *C03C 3/074* (2006.01)
- *C03C 3/16* (2006.01)
- *C03C 8/08* (2006.01)
- *C03C 3/21* (2006.01)
- *E06B 3/67* (2006.01)
- *E06B 3/663* (2006.01)
- *E06B 3/677* (2006.01)
- *C03C 3/145* (2006.01)
- *C03C 8/20* (2006.01)
- *C03C 27/10* (2006.01)

(52) U.S. Cl.
CPC ............... *C03C 3/21* (2013.01); *C03C 8/08* (2013.01); *C03C 8/20* (2013.01); *C03C 8/245* (2013.01); *C03C 27/10* (2013.01); *E06B 3/6612* (2013.01); *E06B 3/66304* (2013.01); *E06B 3/6715* (2013.01); *E06B 3/6775* (2013.01); *C03C 2207/00* (2013.01); *Y02A 30/25* (2018.01); *Y02B 80/24* (2013.01)

(58) Field of Classification Search
CPC .. C03C 8/24; C03C 8/245; C03C 8/20; Y02B 80/24
See application file for complete search history.

(56) References Cited

U.S. PATENT DOCUMENTS

| | | | |
|---|---|---|---|
| 2010/0330309 A1* | 12/2010 | Cooper | C03C 8/02 428/34 |
| 2011/0126976 A1 | 6/2011 | Kikutani et al. | |
| 2012/0213951 A1 | 8/2012 | Dennis | |
| 2012/0213952 A1 | 8/2012 | Dennis | |
| 2012/0213953 A1 | 8/2012 | Dennis | |
| 2012/0213954 A1 | 8/2012 | Dennis | |
| 2012/0308747 A1 | 12/2012 | Dennis | |
| 2013/0305786 A1 | 11/2013 | Kikutani et al. | |

FOREIGN PATENT DOCUMENTS

| | | |
|---|---|---|
| JP | 2008214153 A | 9/2008 |
| JP | 2010-057893 A | 3/2010 |
| JP | 2013062231 A | 4/2013 |
| JP | 2013157161 A | 8/2013 |
| JP | 2013237590 A | 11/2013 |
| WO | 2013/101748 A1 | 7/2014 |

OTHER PUBLICATIONS

Machine translation of applicant cited JP 2013-237590.*

Japanese Office Action dated Feb. 7, 2017 for Application No. 2015-552389.

Japanese Office Action for Japanese Patent Application No. 2015-552389 dated Jun. 6, 2017.

* cited by examiner

HEAT-INSULATING MEMBER, LOW-MELTING GLASS COMPOSITION, AND SEALING MATERIAL PASTE

TECHNICAL FIELD

The present invention relates to a heat-insulating member, and a low-melting glass composition and a sealing material paste that are to be used for airtightly sealing the heat-insulating member.

BACKGROUND ART

Windowpanes for building materials etc. are required to have a heat insulating property from the viewpoints of energy saving, $CO_2$ reduction, and dew condensation prevention, etc. Multilayer glass panels, in each of which a heat ray reflective film is formed on an inner surface of the panel, have been widely developed as the heat-insulating members of the windowpanes, and the spread of the panels has been greatly increased. Such a heat-insulating member, i.e., a multilayer glass panel has a structure in which: a space is provided between a pair of glass substrates; the space has an atmosphere filled with dry air having heat conductivity lower than that of the atmospheric air containing moisture or with argon, or in a vacuum state; and the outer peripheral part of the panel is sealed with a resin or low-melting glass. The heat conductivities of these atmospheres satisfy the relationship of dry air>argon>>vacuum, and the heat insulating property of the panel is increased in the order of dry air<argon<<vacuum. The heat conductivity at 0° C. is 0.0241 W/mK with dry air, 0.0164 W/mK with argon, and 0.0005 W/mK with vacuum. A metal thin film is generally used as the heat ray reflective film, which is often formed on the inner surface of one of the glass substrates. A heat ray reflectance can be improved by forming the metal thin films into a multilayer via oxide thin films. Soda-lime glass, having heat resistance of approximately 500° C., is generally used as the glass substrate, and hence it is necessary to seal the outer peripheral part of the glass substrate at least under a condition in which the temperature is not exceeded.

When the inside of the panel is in a vacuum state, glass sealing using a low-melting glass is adopted to achieve a heat insulating property higher than that of a sealing agent using a resin. A $PbO$—$B_2O_3$-based low-melting glass or $Bi_2O_3$—$B_2O_3$-based low-melting glass is used in the glass sealing. However, the $PbO$—$B_2O_3$-based low-melting glass contains a large amount of harmful lead (Pb), and hence such a low-melting glass cannot be used in electronic and electrical appliances because of environmental regulations, such as RoHS Directive. Building materials have also been required to be lead-free in order to reduce influence on environmental impact. Additionally, it comes to be expected that vacuum heat insulation multilayer glass panels will be developed into refrigerators, freezers, electronic and electrical appliances, and the like, other than windowpanes for building materials, and for such development, it is absolutely necessary to make a glass sealing part lead-free.

On the other hand, the $Bi_2O_3$—$B_2O_3$-based low-melting glass can be made lead-free, and it has already been wholly adopted in electronic and electrical appliances, instead of the $PbO$—$B_2O_3$-based low-melting glass. However, the $Bi_2O_3$—$B_2O_3$-based low-melting glass is softened and fluidized at a temperature higher than that of the $PbO$—$B_2O_3$-based low-melting glass, and hence a multilayer glass panel is airtightly sealed at a temperature near to the heat-resistant temperature of soda-lime glass used as a glass substrate. This makes the production yield of a multilayer glass panel decrease, and hence the $Bi_2O_3$—$B_2O_3$-based low-melting glass is required to have a softening temperature as low as that of the $PbO$—$B_2O_3$-based low-melting glass. Additionally, the $Bi_2O_3$—$B_2O_3$-based low-melting glass contains a large amount of bismuth (Bi), the amount of deposit of which is small, and hence there is the possibility that the continuous and stable supply of Bi may become difficult. Further, Bi is often produced along with by-products of lead, and a large amount of harmful lead wastes are discharged when purified, and hence Bi is not necessarily environmentally-friendly.

Patent Literature 1 proposes that the outer peripheral part of a vacuum heat insulation multilayer glass panel is airtightly sealed by using a lead-free $V_2O_5$—$BaO$—$ZnO$-based low-melting glass. It is disclosed that the composition of the $V_2O_5$—$BaO$—$ZnO$-based low-melting glass suitable for the airtight sealing contains 45 to 50 mol % of $V_2O_5$, 20 to 23 mol % of BaO, and 19 to 22 mol % of ZnO.

CITATION LIST

Patent Literature

Patent Literature 1: International Publication WO No. 2013/101748

SUMMARY OF INVENTION

Problems to be Resolved by the Invention

The multilayer glass panel to be adopted as a heat-insulating member is required: to have a high heat insulating property achieved by airtight sealing; to maintain the property over a long time (reliability); to reduce influence on environmental impact (sealing part should be lead-free); to survive an acidic environment, such as acid rain (acid resistance of a sealing part); and the like. However, the $V_2O_5$—$BaO$—$ZnO$-based low-melting glass described in Patent Literature 1 has a high crystallization tendency, and is likely to be crystallized during glass sealing. In order to match the thermal expansion of a sealing part and a glass substrate, filler particles for adjusting the thermal expansion are sometimes mixed and dispersed in the sealing part, but the filler particles often promote the crystallization of the low-melting glass. A thermal expansion coefficient and softening fluidity are changed depending on the kind and size of a deposited crystal generated by crystallization and on the degree of crystallization. The multilayer glass panels to be developed into windowpanes etc. are large in size, and hence it is not easy to airtightly seal them by uniformly controlling the crystallization across the panel. If a variation is caused in the degree of crystallization, it becomes difficult to stably achieve airtight sealing with high reliability, due to a difference in thermal expansion or softening fluidity.

Additionally, an acid resistance test that simulates acid rain is not performed in Patent Literature 1; however, in order to be developed into windowpanes for building materials, it is also very important to secure the reliability in environment resistance by performing such a practical test.

An object of the present invention is to reduce influence on environmental impact and to achieve maintenance of airtightness and an improvement in acid resistance.

Means of Solving the Problems

A heat-insulating member according to the present invention includes a pair of substrates and an airtight sealing part, in which the airtight sealing part is formed in an outer peripheral part between the pair of substrates to form a space between the pair of substrates, the space being in a vacuum or reduced pressure state, a sealing material that forms the airtight sealing part includes a low-melting glass, and the low-melting glass contains a vanadium oxide, barium oxide, phosphorus oxide, and tungsten oxide in which the following two relational expressions (wherein unit: mol %) are satisfied in terms of oxide contents:

$V_2O_5+BaO+P_2O_5+WO_3 \geq 90$
$V_2O_5>BaO>P_2O_5>WO_3$.

Advantageous Effect of the Invention

According to the present invention, influence on environmental impact can be reduced and maintenance of airtightness and an improvement in acid resistance can be achieved.

DESCRIPTION OF EMBODIMENTS

Hereinafter, embodiments of the present invention will be described.

Figure 1A:
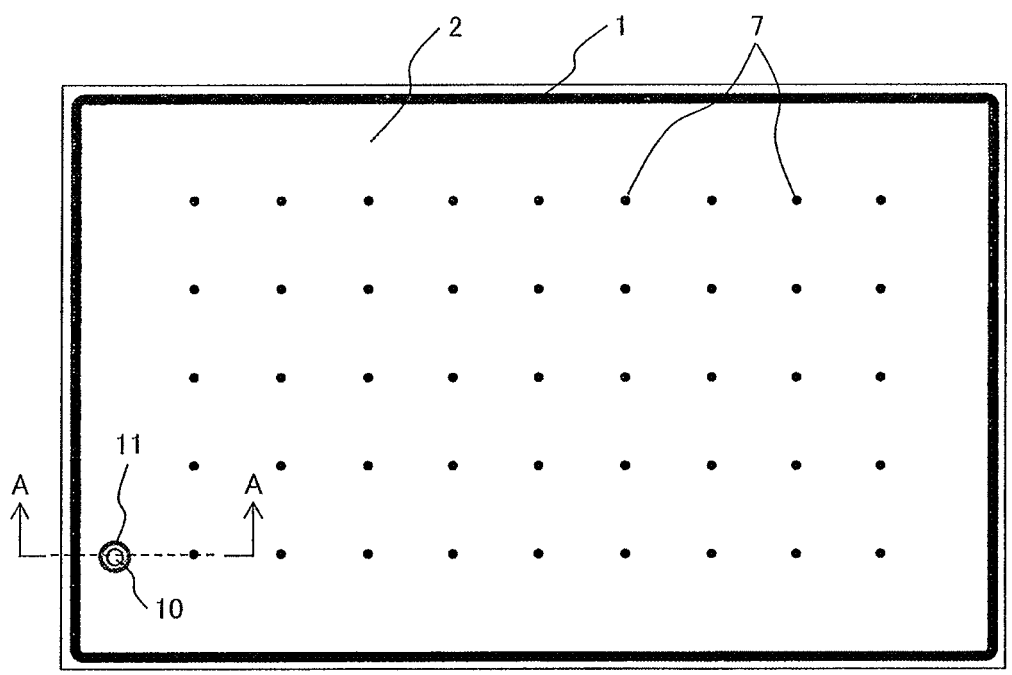
FIG. 1A is a plan view illustrating an example of a heat-insulating member.
Figure 1B:
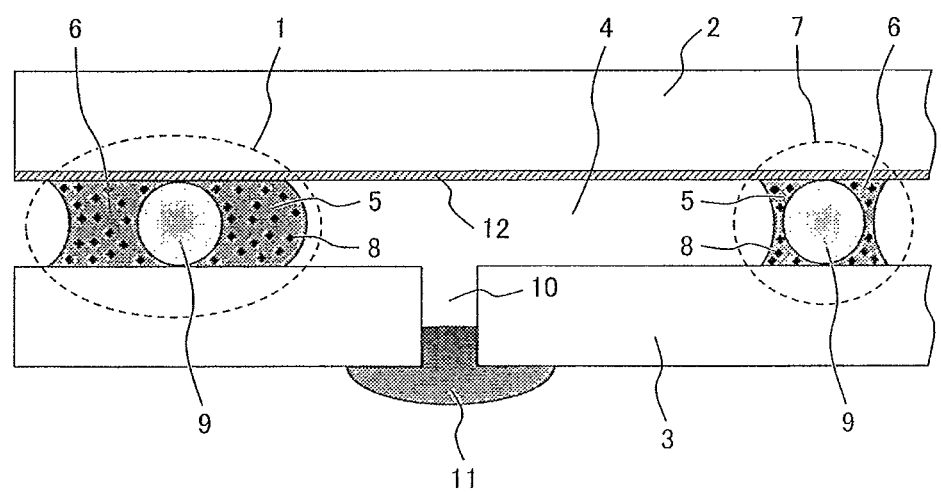
FIG. 1B is a sectional view taken along A-A Line, illustrating a neighborhood of an airtight sealing part of the heat-insulating member of FIG. 1A.

FIG. 1A is a plan view illustrating an example of a heat-insulating member. FIG. 1B is a sectional view taken along A-A Line, illustrating a neighborhood of an airtight sealing part of the heat-insulating member of FIG. 1A.

Figure 2A:
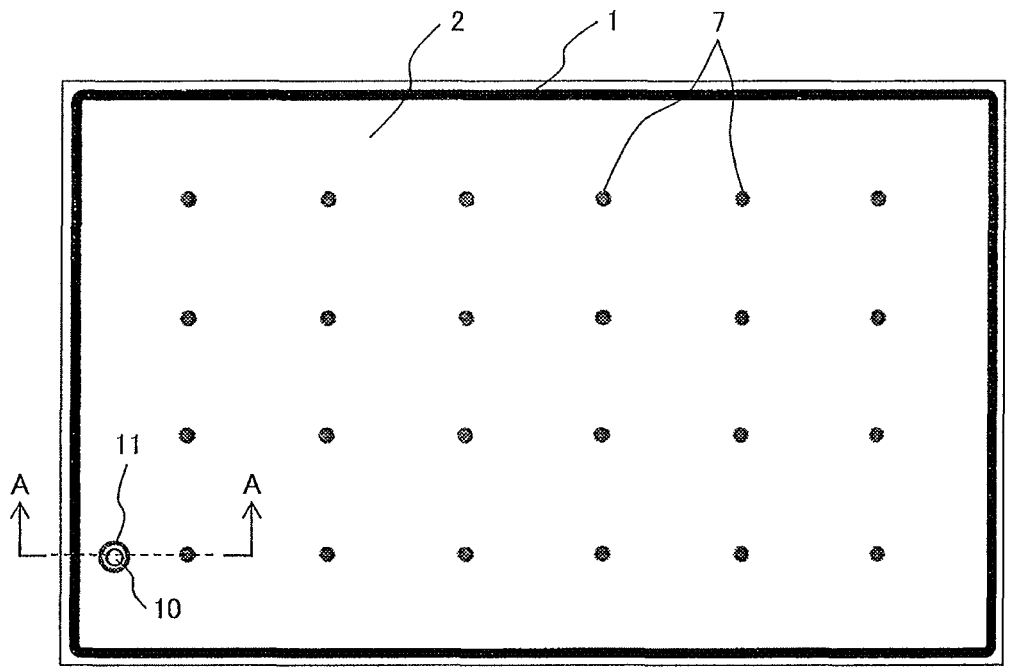
FIG. 2A is a plan view illustrating another example of a heat-insulating member.
Figure 2B:
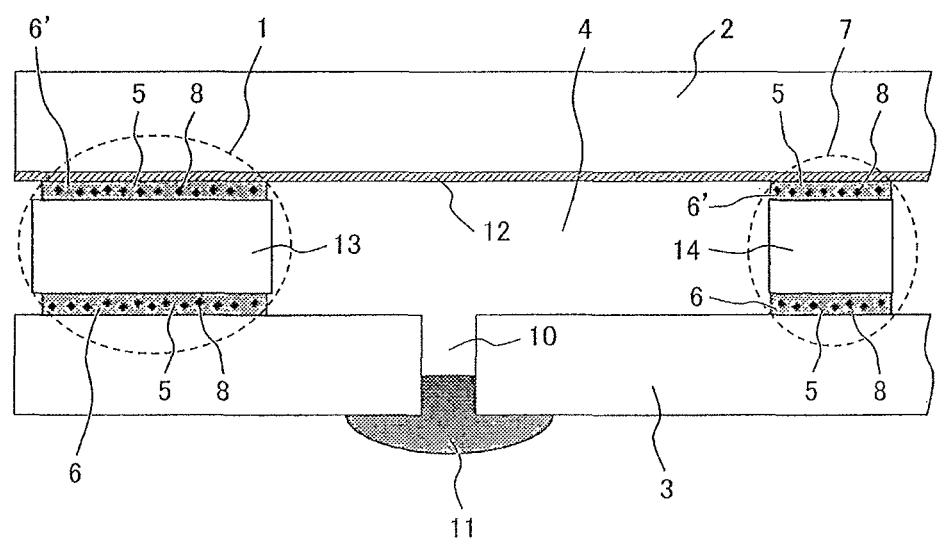
FIG. 2B is a sectional view taken along A-A Line, illustrating a neighborhood of an airtight sealing part of the heat-insulating member of FIG. 2A.

FIG. 2A is a plan view illustrating another example of a heat-insulating member. FIG. 2B is a sectional view taken along A-A Line, illustrating a neighborhood of an airtight sealing part of the heat-insulating member of FIG. 2A.

Hereinafter, a substrate made of glass will be described as a substrate of a heat-insulating member, but the substrates to be used in the invention should not be limited to ones formed by so-called glass, and a substrate formed by: alumina, aluminum nitride, silicon nitride, or another ceramics; or a copper alloy, silver alloy, iron alloy, nickel alloy, or another metal, may be used. Further, a substrate: in which, for example, a coated film made of a metal, glass, or the like, is formed on the surface of a substrate made of ceramics, or the like; or in which a coated film made of ceramics, or the like, is formed on the surface of a substrate made of a metal, glass, or the like, may be used.

Examples of the applications of a heat-insulating member whose substrate is formed by ceramics or a metal include: heat insulating containers, such as a thermos bottle; wall surfaces of refrigerators and freezers; and heat insulating boards, such as building materials.

The heat-insulating member illustrated in FIGS. 1A and 1B is one in which: a space 4 is provided between a pair of substrates 2 and 3 having an airtight sealing part 1 at the outer peripheral part of the substrates; the space 4 is in a vacuum or reduced pressure state; and a sealing material 6 containing a low-melting glass 5 is used in the airtight sealing part 1. In the multilayer glass panels to be used in windowpanes for building materials, refrigerators, freezers, and the like, soda-lime glass having heat resistance of approximately 500° C. is commonly used for the substrates 2 and 3. Because a glass substrate is likely to be broken by deformation, a plurality of spacers 7 are installed in the space 4 in a vacuum or reduced pressure state. The sealing material 6 to be used in the airtight sealing part 1 contains filler particles 8 for matching the thermal expansion coefficients of the substrates 2 and 3, in addition to the low-melting glass 5. Additionally, in order to obtain the airtight sealing part 1 having an appropriate thickness, it is effective to introduce a plurality of spherical beads 9 for spacer into the sealing material 6. The spherical beads 9 for spacer can be utilized also in the spacer 7 in order to control the thickness thereof.

Herein, the "reduced pressure state" refers to air pressure lower than the atmospheric air pressure (1 atmospheric pressure).

Further, the low-melting glass 5 and the filler particle 8, which are to be used in the sealing material 6, can be utilized for fixing the spacer 7, similarly to the airtight sealing part 1. When the space 4 is caused to be in a vacuum state, an exhaust hole 10 is formed in the in advance, so that the air in the space 4 is discharged from the exhaust hole 10 by using a vacuum pump. After the discharge, a cap 11 is attached such that the degree of vacuum in the space 4 can be maintained. When the space 4 is caused to be in a reduced pressure state, the exhaust hole 10 is unnecessary and the state can be achieved by airtight sealing with heating. This is because the gas, confined in the space 4 after the airtight sealing, contracts when cooled. When the heat-insulating member is adopted as a windowpane for building materials, it is necessary to form a heat ray reflective film 12 on the inner surface of the substrate 2 in advance by a vacuum deposition method, or the like.

The heat-insulating member illustrated in FIGS. 2A and 2B is one: in which the volume of a space 4 between a pair of substrates 2 and 3 is large, i.e., the distance between the substrates 2 and 3 is large; and that is airtightly sealed by sealing materials 6 and 6' each containing a low-melting glass 5 via a square bar 13. It is preferable that the material of the square bar 13 is the same as those of the substrates 2 and 3 in order to match to the thermal expansion coefficients of the substrates 2 and 3. Filler particles 8 in the sealing materials 6 and 6' are contained to match thermal expansion coefficients, similarly in the heat-insulating member illustrated in FIGS. 1A and 1B. A plurality of spacers 7 arranged in the space 4 are fixed in the same way as that in the airtight sealing part 1. The substrates 2 and 3 are adhered together by the sealing materials 6 and 6' via a prism or cylinder 14. It is preferable that the material of the prism or cylinder 14 is the same as those of the substrates 2 and 3 similarly to the square bar 13.

The low-melting glass 5 contained in the sealing material 6 contains a vanadium oxide, barium oxide, phosphorus oxide, and tungsten oxide in which the following two relational expressions are satisfied in terms of oxide contents: $V_2O_5+BaO+P_2O_5+WO_3 \geq 90$ mol % and $V_2O_5 > BaO > P_2O_5 > WO_3$ (mol %). The low-melting glass 5 that satisfies this condition does not contain lead and bismuth, and can reduce influence on environmental impact as a heat-insulating member. Further, the low-melting glass 5 is not crystallized at a temperature of the heat-resistant temperature or lower of the soda-lime glass to be used for the substrates 2 and 3, and has good softening fluidity, and good acid resistance can be obtained, and hence a heat-insulating member having the airtight sealing part 1 excellent in productivity and reliability can be provided. As described above with reference to FIGS. 1A and 1B, it is effective that this heat-insulating member is a multilayer glass panel in which the outer peripheral part of a pair of glass substrates is airtightly sealed by the sealing material 6 containing the low-melting glass 5 via a plurality of the spacers 7.

Furthermore, it is effective that the low-melting glass 5 contains, in terms of oxide contents, 35 to 47 mol % (35 mol % or more and 47 mol % or less) of $V_2O_5$, 20 to 35 mol % of BaO, 15 to 25 mol % of $P_2O_5$, and 3 to 13 mol % of $WO_3$. $V_2O_5$, a major component, is an essential component for making a lead-free low-melting glass 5, and if contained in an amount smaller than 35 mol %, the characteristic temperature of glass, e.g., a softening point may be increased, and hence it becomes hard to obtain good softening fluidity at a low temperature. On the other hand, if contained in an amount larger than 47 mol %, acid resistance may be decreased, or crystallization is more likely to occur. BaO is a component for improving vitrification and acid resistance, and if contained in an amount of 20 mol % or less, a good acid resistance may not be obtained. On the other hand, if contained in an amount larger than 35 mol %, a softening point may be increased, and hence it becomes hard to obtain good softening fluidity at a low temperature. $P_2O_5$ is the most effective component for vitrification, and if contained in an amount smaller than 15 mol %, crystallization is more likely to occur, and hence good softening fluidity may not be obtained at a low temperature. On the other hand, if contained in an amount larger than 25 mol %, acid resistance may be decreased, or a softening point may be increased, thereby causing softening fluidity to be deteriorated at a low temperature. Because $WO_3$ can suppress crystallization, the content of $P_2O_5$ can be reduced, acid resistance can be improved, and an increase in a softening point can be suppressed; however, if contained in an amount smaller than 3 mol %, these effects may not be obtained. On the other hand, if contained in an amount larger than 13 mol %, crystallization is, conversely, more likely to occur, a softening point may be increased, and the like, and hence it becomes hard to obtain good softening fluidity at a low temperature.

The low-melting glass 5 may further contain, in terms of oxide contents, 0 to 10 mol % (larger than 0 mol %, 10 mol %) of the total of one or more of the oxides selected from the group consisting of $MoO_3$, $TeO_2$, SrO, ZnO, $K_2O$, and $Na_2O$. When $MoO_3$ or ZnO is contained, an effect similar to that obtained when $WO_3$ is contained can be obtained, although not so large as $WO_3$. However, if they are contained in a large amount, acid resistance may be decreased, or crystallization may be conversely promoted. When SrO is contained, the effect of improving acid resistance can be obtained similarly when BaO is contained; however, if contained in a large amount, crystallization may be conversely promoted. When $TeO_2$ is contained, the effects of lowering a softening temperature and suppressing crystallization can be obtained; however, the amount of deposit of $TeO_2$ is small and the cost is high, and hence if contained in a large amount, it becomes difficult to provide it stably and at low cost. When $K_2O$ or $Na_2O$ is contained, the effect of lowering a softening temperature can be obtained; however, if contained in a large amount, a thermal expansion coefficient may become too large, or acid resistance may be decreased. From the facts described above, these components have advantages and disadvantages, and hence it is preferable that the total amount of them is 10 mol % or less.

Additionally, it is preferable that the aforementioned low-melting glass 5 satisfies, in terms of oxide contents, the following relational expression: 37 mol % BaO+$P_2O_5$ 55 mol %. Within the range, a softening point is 396 to 446° C. and crystallization does not occur at a temperature of 550° C. or lower, and hence the softening fluidity, obtained at a temperature of the heat-resistant temperature or lower of a soda-lime glass substrate normally used as the substrates 2 and 3, is good.

Further, it is preferable that the low-melting glass 5 satisfies, in terms of oxide contents, the following relational expression: 42 mol % $\leq V_2O_5+WO_3 \leq 55$ mol %. Within the range, the thermal expansion coefficient between 30 and 250° C. is (91 to 130)×$10^{-7}$/° C., and it becomes possible to match to the thermal expansion coefficient of a soda-lime glass substrate by containing the filler particle 8 having a small thermal expansion coefficient. The thermal expansion coefficient, between 30 and 250° C., of the soda-lime glass is approximately 85×$10^{-7}$/° C. If the thermal expansion coefficient of the low-melting glass 5 is larger than 130×$10^{-7}$/° C., the filler particles 8 should be contained in a very large amount, and accordingly the softening fluidity of the low-melting glass 5 is deteriorated, which makes it hard to obtain good adhesiveness. Therefore, it is preferable to contain the filler particles 8 in an amount of 50 parts by volume of less based on 100 parts by volume of the low-melting glass.

It is preferable that the filler particles 8 are one or more selected from the group consisting of $Zr_2(WO_4)(PO_4)_2$, $LiAlSiO_4$, $Mg_2Al_4Si_5O_{18}$, $ZrSiO_4$, $SiO_2$ glass, $Al_6Si_2O_{13}$, and $Nb_2O_5$, each of which has a thermal expansion coefficient smaller than that of the low-melting glass. When these filler particles 8 are contained, the thermal expansion coefficient of the sealing material 6 can be reduced, so that the thermal expansion coefficient can be matched to that of a soda-lime glass substrate to be used as the substrates 1 and 2. Because the mechanical strength of the sealing material 6 is normally lower than that of soda-lime glass, it is preferable that slight compressive stress is applied to the sealing material 6, and accordingly it is better that the thermal expansion coefficient of the sealing material 6 is lower than that of soda-lime glass. Specifically, it is preferable that the thermal expansion coefficient, between 30 and 250° C., of the sealing material 6 is within a range of $(60\text{ to }80) \times 10^{-7}/°$ C.

Additionally, it is effective, in the heat-insulating member as illustrated in FIGS. 1A and 1B, that a plurality of the spherical beads 9 for spacer are contained in the sealing material 6, thereby allowing the member to be airtightly sealed with an appropriate film thickness. It is preferable to contain the spherical glass beads 9 in an amount of 1 part by volume or lower based on 100 parts by volume of the powder particles in the composition of the low-melting glass 5. When the spherical glass bead 9 is used as a spacer in the airtight sealing part 1, an effect can be obtained in a minimal amount. It is preferable that the spherical bead 9 for spacer is one selected in consideration of dimensional accuracy and price.

The heat-insulating member according to the present embodiment can be airtightly sealed, by the sealing material 6 in which the aforementioned low-melting glass 5 is adopted, at a temperature of 420 to 500° C., which is lower than the heat-resistant temperature of a soda-lime glass substrate to be used as the substrates 2 and 3, and the productivity and reliability of the member can be improved. Further, influence on environmental impact can be reduced.

As described above, the heat-insulating member according to the present embodiment can achieve: a high heat insulating property and long-term maintenance of the property (airtight sealing); a reduction in influence on environmental impact (making a sealing part lead-free); the reliability with respect to acid rain (acid resistance of the sealing part); and the like, and hence the heat-insulating member can be effectively adopted as the multilayer glass panel for windowpanes, refrigerators and freezers. The present invention should not be limited to the aforementioned heat-insulating member and can be widely developed into places where a heat insulating property is required.

Subsequently, a method of producing a heat-insulating member according to the present embodiment will be described. A method of producing the heat-insulating member illustrated in FIGS. 1A and 1B will be described with reference to FIGS. 3A to 6.

Figure 3A:
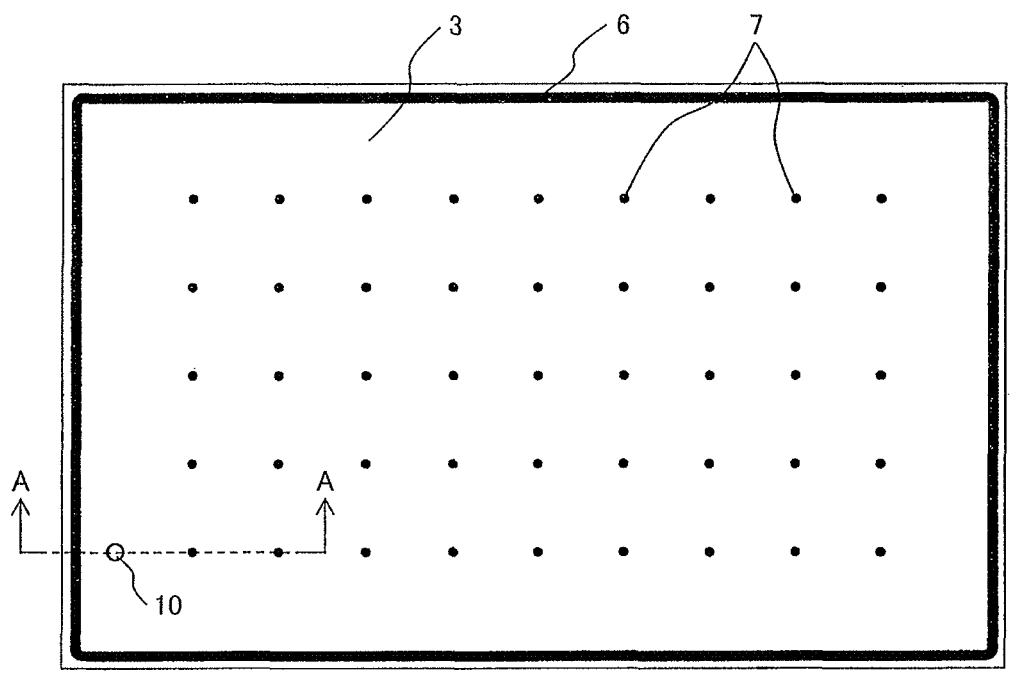
FIG. 3A is a plan view illustrating a state in the middle of the production of the heat-insulating member illustrated in FIGS. 1A and 1B.
Figure 3B:
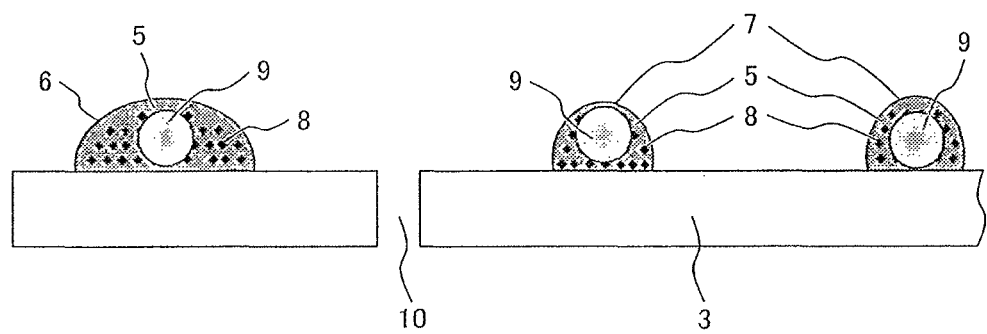
FIG. 3B is a sectional view taken along A-A Line in FIG. 3A.
Figure 4A:
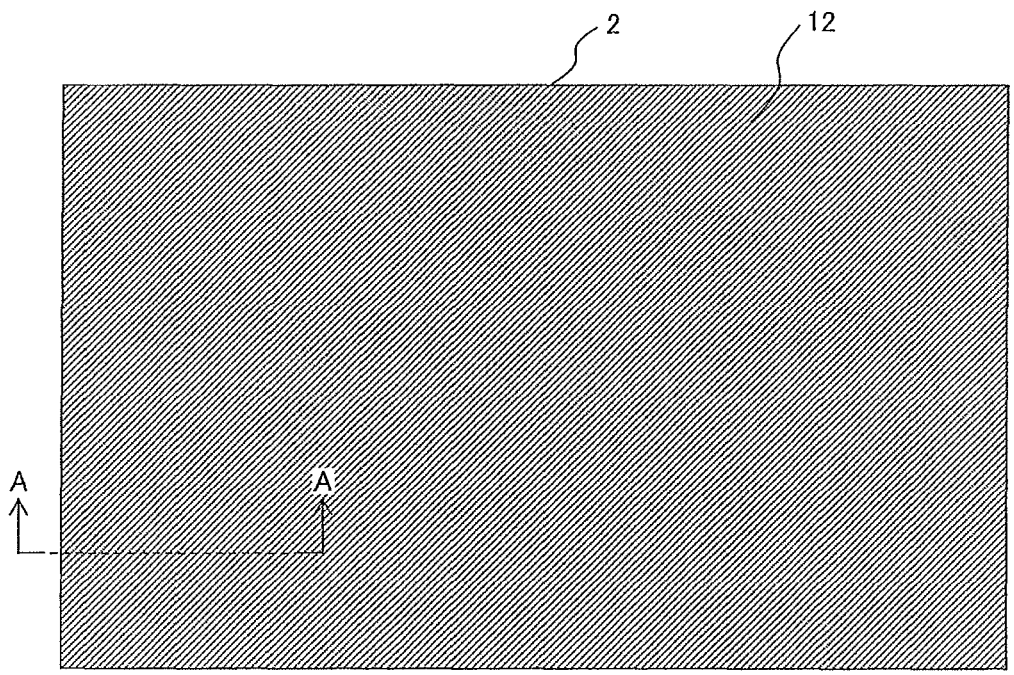
FIG. 4A is a plan view illustrating a state in the middle of the production of the heat-insulating member illustrated in FIGS. 1A and 1B.
Figure 4B:
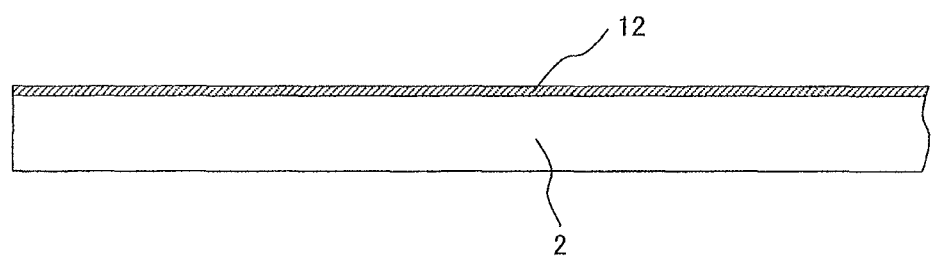
FIG. 4B is a sectional view taken along A-A Line in FIG. 4A.

FIGS. 3A and 4A are schematic plan views of a heat-insulating member, while FIGS. 3B and 4B are schematic sectional views each taken along A-A Line, illustrating a neighborhood of an airtight sealing part (outer peripheral part) of the member.

Figure 5:
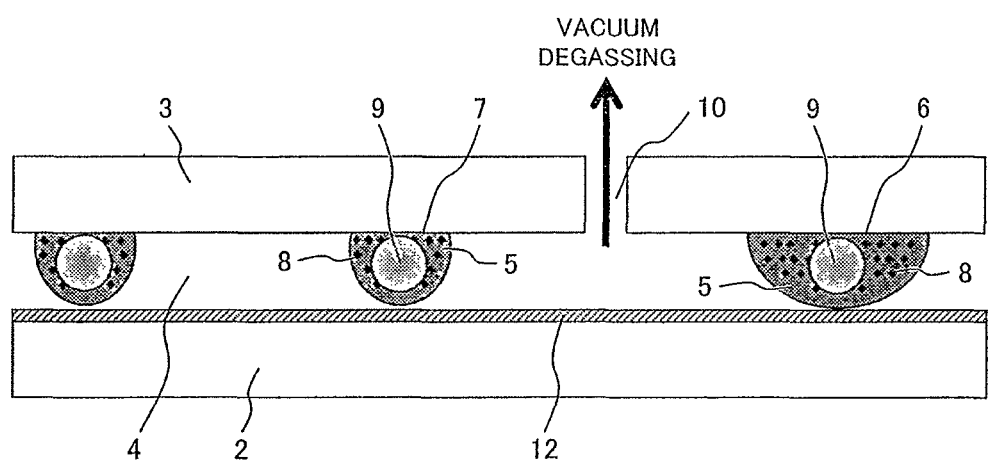
FIG. 5 is a schematic sectional view illustrating a production step of the heat-insulating member illustrated in FIGS. 1A and 1B.
Figure 5:
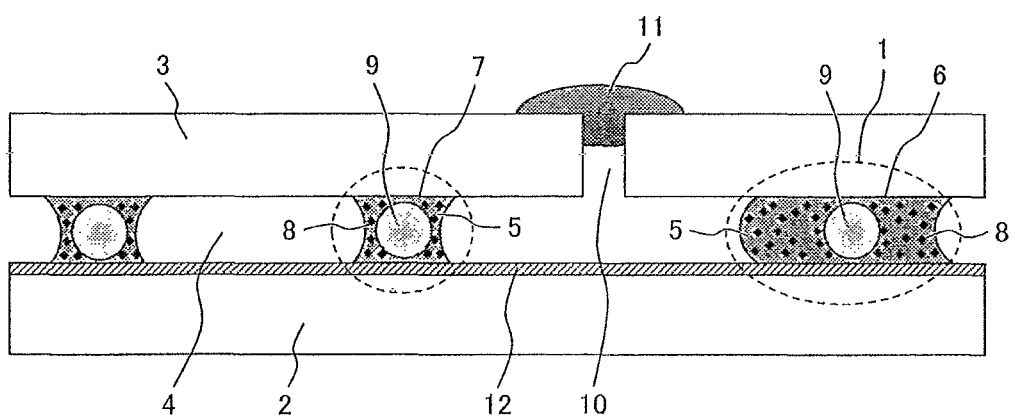
Figure 6:
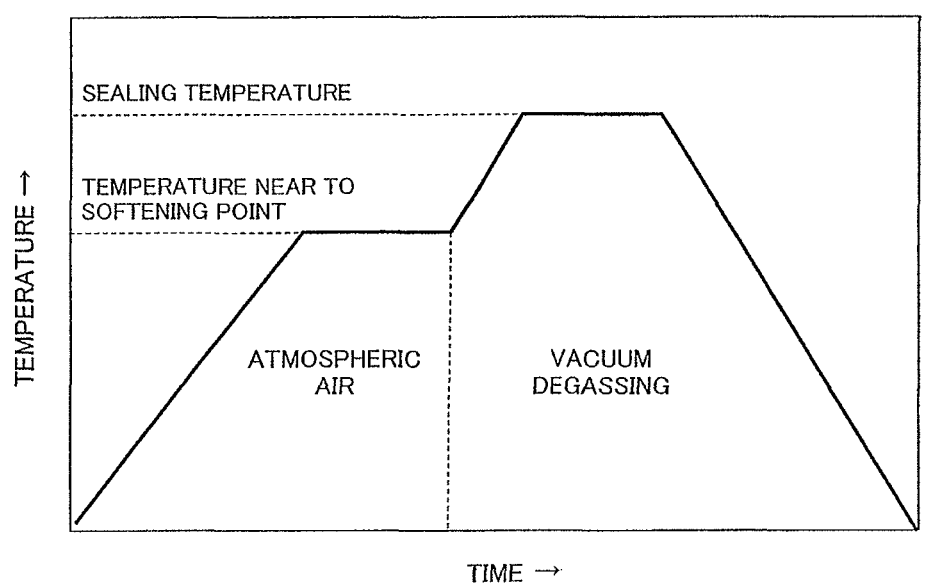
FIG. 6 is a graph showing an example of a sealing temperature profile for a heat-insulating member.

A sealing material 6 which contains a low-melting glass 5, filler particles 8, and spherical beads 9 for spacer is provided in the outer peripheral part of a substrate 3 having an exhaust hole 10. Similarly, a plurality of spacers 7 are provided on the inner surface of the substrate 3. In the spacer 7, the number of the spherical beads 9 for spacer should be larger than that in the sealing material 6. In a forming method of them, a sealing material paste to become the sealing material 6 and a paste for spacer are first coated onto the outer peripheral part and the inner surface of the substrate 3 by a dispenser method and then dried. The low-melting glass 5 contained in the sealing material 6 and the spacer 7 are then softened and fluidized by a baking furnace in order to be formed on the substrate 3 by baking. Subsequently, a heat ray reflective film 12 is formed on the whole surface of the substrate 2 by a vapor deposition method, as illustrated in FIGS. 4A and 4B. The surface of the substrate 3, on which the sealing material 6 and the spacer 7 are formed, and the surface of the substrate 2, on which the heat ray reflective film 12 is formed, are faced each other, as illustrated in FIG. 5, so that the positions of the substrates 2 and 3 are matched to each other and they are fixed by heat-resistant clips, etc. An exhaust pipe is joined to an exhaust hole 10 in the substrate 3, and the exhaust pipe is connected to a vacuum pump. The substrates 2 and 3 are heated, in a baking furnace, according to the sealing temperature profile as illustrated in FIG. 6.

The substrates 2 and 3 are first heated, in the atmospheric air, to a temperature near to the softening point of the low-melting glass 5 contained in the sealing material 6 and held. After the whole multilayer glass panel is held until it has an almost uniform temperature near to the softening point, it is further heated and held, while the air between the substrates 2 and 3 is being discharged from the exhaust hole 10 by a vacuum pump. During the step, each of the sealing material 6 and the spacer 7 is crushed to a predetermined thickness and the substrates 2 and 3 are joined together. Herein, it is necessary to be careful not to melt the low-melting glass 5 contained in the sealing material 6 too much. It is because the sealing material 6 or the low-melting glass 5 contained therein may be incorporated into the inside of the multilayer glass panel by the vacuum discharge. After the multilayer glass panel is held at the temperature near to the softening point, the exhaust pipe is closed, and a cap 11 is attached to the exhaust hole 10 in order to plug the exhaust hole, thereby allowing the degree of vacuum inside the panel to be maintained. Thus, a multilayer glass panel having the airtight sealing part 1, the inside of which is in a vacuum state, is produced.

When the heat-insulating member illustrated in FIGS. 1A and 1B, the inside of which is in a reduced pressure state, is produced, the exhaust hole 10 in the substrate 3 is unnecessary. When the multilayer glass panel in the state illustrated in FIG. 5 is heated in that case, the inside of a baking furnace is filled with gas having heat conductivity lower than that of the atmospheric air containing some moisture, for example, dry air or argon. In order to fill the inside with these gas, dry air or argon is introduced after the air in the inside is discharged by a vacuum pump. The sealing material 6 and the spacer 7 formed on the substrate 3 are heated and joined to the substrate 2 by the weight of the substrate 3 itself and by putting a weight on the substrate 3. In the heating in that case, a sealing temperature should be higher than that in the aforementioned vacuum degassing sealing. Because the gas (dry air or argon), introduced into the multilayer glass panel that is airtightly sealed, contracts when cooled, the inside of the panel filled with dry air or argon is in a reduced pressure state. The heat insulating property in that case is inferior to that in the aforementioned vacuum state, but the multilayer glass panel can be produced at lower cost. A getter may be put inside the panel in order to maintain a heat insulating property for a long period of time.

Subsequently, a method of producing the heat-insulating member illustrated in FIGS. 2A and 2B will be described with reference to FIGS. 7A to 10.

Figure 7A:
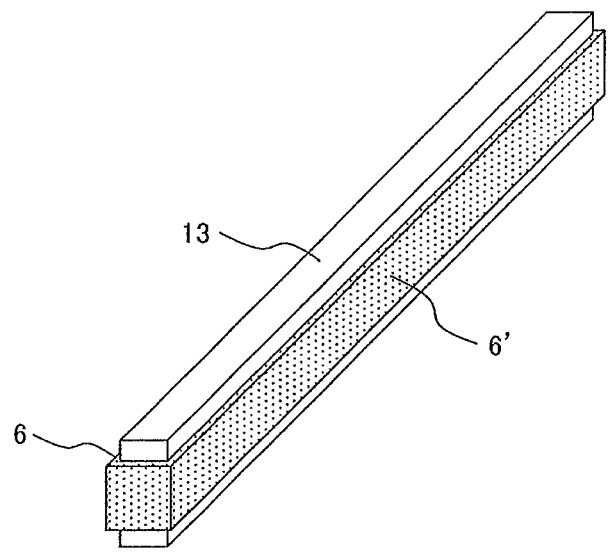
FIG. 7A is a perspective view illustrating a state of a spacer member (square bar), which is to be used in the heat-insulating member illustrated in FIGS. 2A and 2B, in a treatment step after a sealing material paste is coated onto the spacer member (square bar).
Figure 7B:
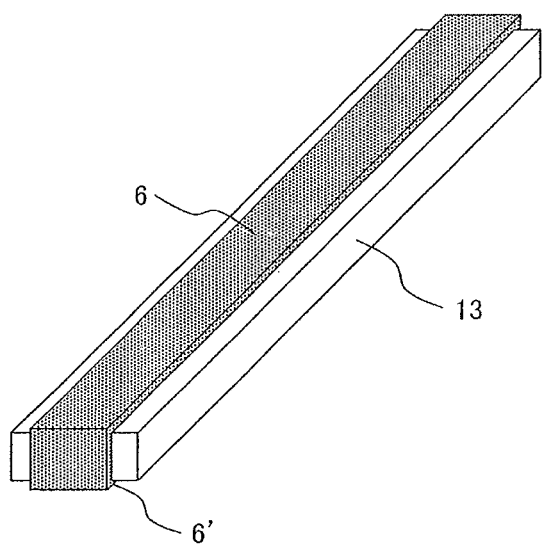
FIG. 7B is a perspective view illustrating a state after the spacer member (square bar) of FIG. 7A is subjected to a baking treatment.

A sealing material paste containing the low-melting glass 5 and the filler particles 8 is coated onto both the sealing surfaces of the square bar 13 and a connection surface of the square bar 13, on the connection surface the square bars 13 are connected together, in a belt shape by a print method or dispenser method, as illustrated in FIG. 7A, and then the paste is dried and baked without the coated surfaces contacting the floor. Thereby, the square bar 13 for airtight sealing, on the surfaces of which the sealing materials 6 and 6' are formed as illustrated in FIG. 7B, is produced.

Figure 8A:
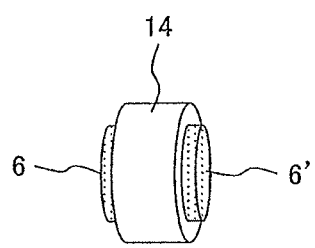
FIG. 8A is a perspective view illustrating a production step of a spacer member (cylinder) to be used in the heat-insulating member illustrated in FIGS. 2A and 2B.
Figure 8B:
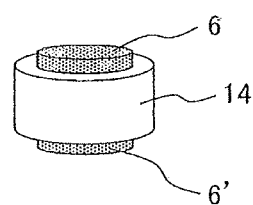
FIG. 8B is a perspective view illustrating a state after the spacer member (cylinder) of FIG. 8A is subjected to a baking treatment.

With respect to the spacer 7 to be installed inside the multilayer glass panel, the sealing material paste is coated onto both the adhesive surfaces of the cylinder 14 in the same way as described above, as illustrated in FIG. 8A, and then the paste is dried and baked, thereby allowing the cylinder 14 for the spacer 7, on the surfaces of which the sealing materials 6 and 6' are formed as illustrated in FIG. 8B, to be produced.

Figure 9:
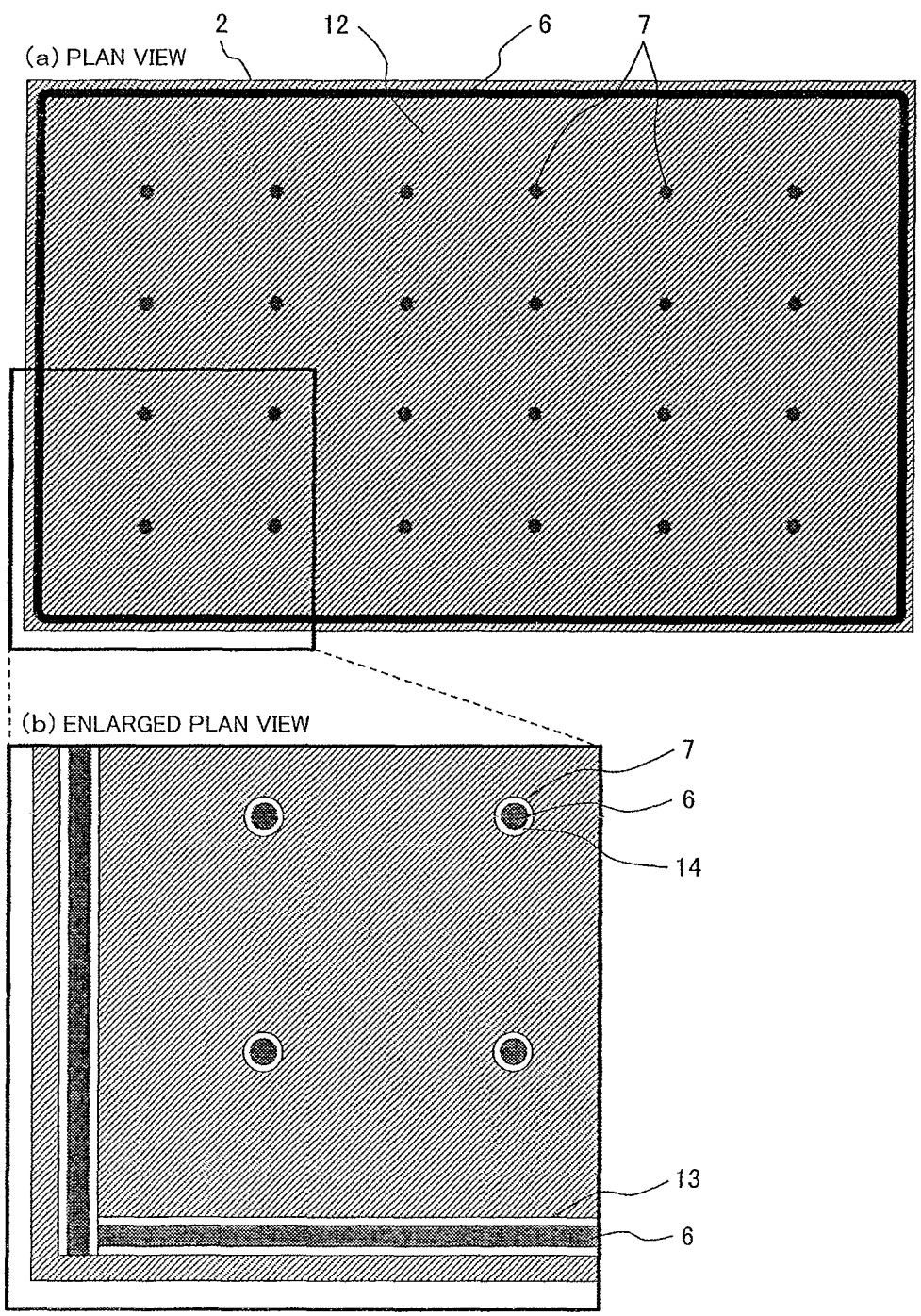
FIG. 9 is a plan view and an enlarged view each illustrating the heat-insulating member illustrated in FIGS. 2A and 2B in the middle of the production thereof.
Figure 10:
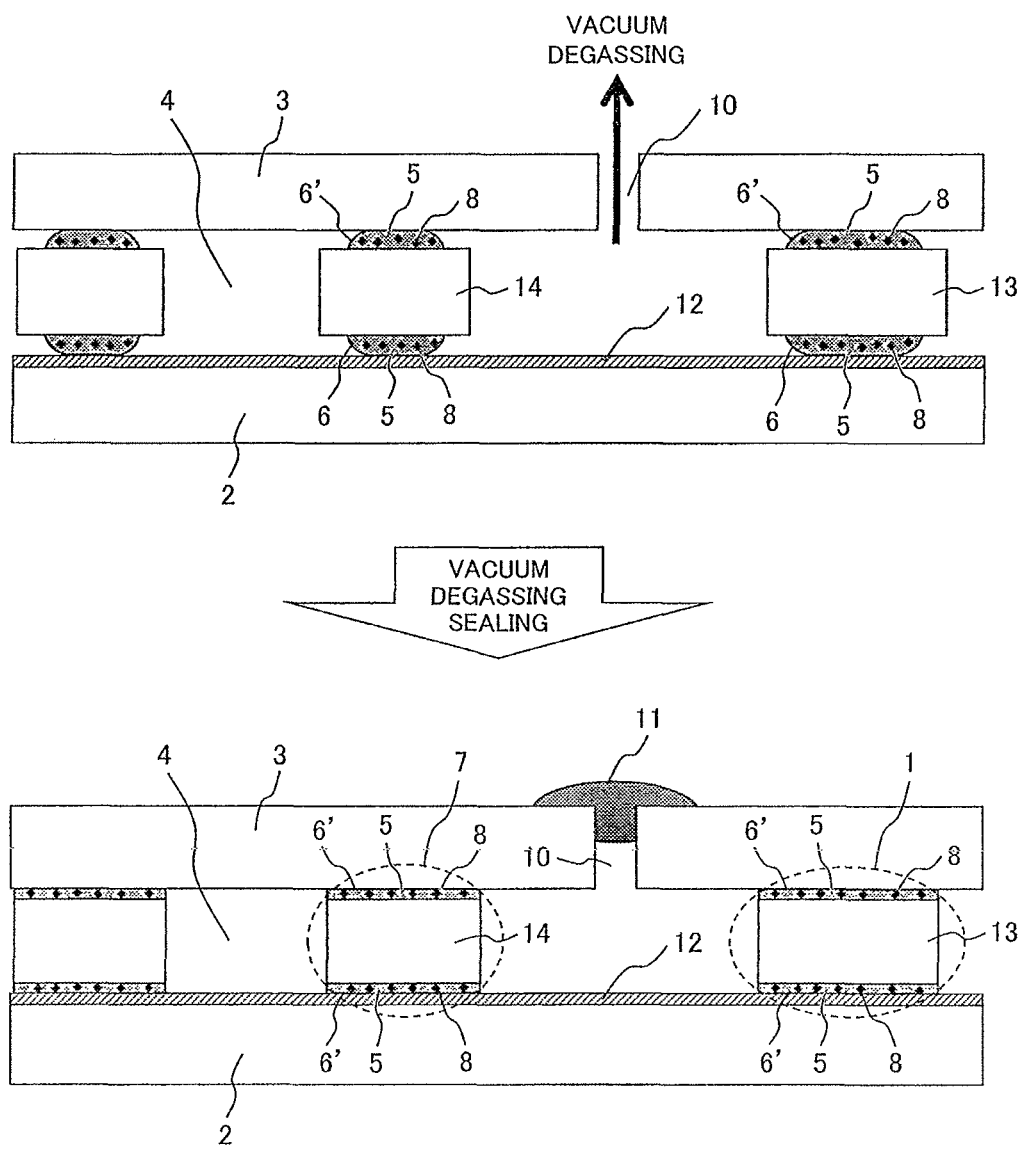
FIG. 10 is a schematic sectional view illustrating a production step of the heat-insulating member illustrated in FIGS. 2A and 2B.

The square bar 13 and the cylinder 14, on the surfaces of which the sealing materials 6 and 6' are formed, are arranged on the substrate 2, on the surface of which the heat ray reflective film 12 is formed, as illustrated in FIG. 9. (a) of FIG. 9 is a plan view of the heat-insulating member, while (b) is an enlarged view of a corner of the plan view. The substrate 3, in which the exhaust hole 10 is formed, is arranged on the square bar 13 and the cylinder 14, as illustrated in FIG. 10, and they are fixed by heat-resistant clips, etc. An exhaust pipe and a vacuum pump are connected to the exhaust hole 10, and a multilayer glass panel having the airtight sealing part 1, the inside of which is in a vacuum state, is produced in the same way as the method of producing the heat-insulating member of FIGS. 1A and 1B, the method being illustrated in FIGS. 3A to 6. When the heat-insulating member of FIGS. 2A and 2B, the inside of which is in a reduced pressure state, is produced, a multilayer glass panel, the inside of which is in a reduced pressure state, is produced in the same way as that of the heat-insulating member of FIGS. 1A and 1B.

As described above, by the heat-insulating member according to the present embodiment, a low-melting glass composition to be used for the airtight sealing of the member, and a sealing material paste to be used in the composition, influence on environmental impact can be reduced and an airtight sealing part excellent in reliability and productivity can be obtained; and hence the heat-insulating member can be developed as a heat insulation multilayer glass panel to be adopted particularly in windowpanes for building materials, refrigerators and freezers.

The heat-insulating member according to the present invention is not necessarily required to be transparent, and a translucent or opaque substrate may be used depending on an application.

Hereinafter, the present invention will be described in more detail by using Examples. However, the invention should not be limited to the Examples described herein, and the Examples may be arbitrarily combined.

EXAMPLE 1

In the present Example, compositions and characteristics of low-melting glasses to be contained in a sealing material for a heat-insulating member were examined. Examples are shown in Tables 1 to 4, while Comparative Examples in Table 5. In Comparative Examples, PbO—$B_2O_3$-based low-melting glasses which is previously typical was also produced and evaluated. In order to produce the low-melting glass compositions shown in Tables 1 to 5, $V_2O_5$, $Ba(PO_3)_2$, $BaCO_3$, $P_2O_5$, $WO_3$, $MoO_3$, $TeO_2$, $SrCO_3$, $ZnO$, $K_2CO_3$, $Na_2CO_3$, $PbO$, $B_2O_3$, $SiO_2$, and $Al_2O_3$ were used as glass raw materials. Certain amounts of these glass raw materials were blended such that the total amount thereof was 200 g, and they were mixed, put into a platinum crucible, and then heated to 1000 to 1100° C. at a heating rate of 5 to 10° C./minute in an electric furnace to be melted. They were held at this temperature for two hours while being stirred, so that uniform glass was obtained. Thereafter, the crucible was taken out, and a low-melting glass composition was produced by casting onto a stainless plate that had been heated to approximately 200° C. in advance.

After the produced low-melting glass composition was coarsely crushed by a stamp mill, it was further crushed by a ball mill until the mean particle diameter fell within a range of 10 to 25 μm. The density of the powder was measured by a pycnometer method using helium (He) gas. The transition point ($T_g$), yield point ($M_g$), softening point ($T_s$), and the crystallization temperature ($T_{cry}$) of the powder were measured by a differential thermal analysis (DTA) in which the powder was heated to 550° C. at a heating rate of 5° C./minute. Herein, alumina ($Al_2O_3$) powders were used as a standard sample.

Figure 11:
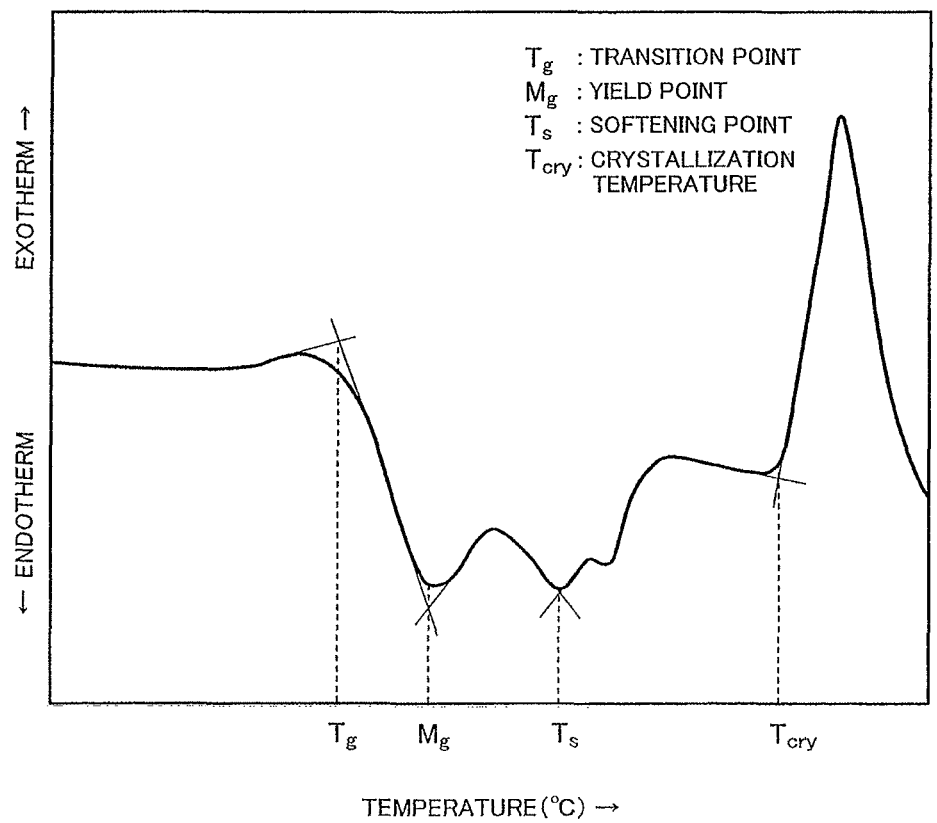
FIG. 11 is a graph showing a result of differential thermal analysis (DTA) of a typical low-melting glass.

The DTA curve of a typical low-melting glass composition is shown in FIG. 11. As shown in FIG. 11, $T_g$ is the starting temperature of a first endothermic peak, $M_g$ is the peak temperature thereof, $T_s$ is the peak temperature of a second endothermic peak, and $T_{cry}$ is the starting temperature of an exothermic peak occurring due to crystallization. The characteristic temperatures of glass are defined by viscosity, and it is said that $T_g$, $M_g$, and $T_s$ are temperatures corresponding to viscosities of $10^{13.3}$ poise, $10^{11.0}$ poise, and $10^{7.65}$ poise, respectively. In order to soften and fluidize glass at a low temperature, $T_s$ should be lowered as much as possible. Further, it is preferable that $T_{cry}$ is raised as much as possible with respect to $T_s$, because softening fluidity is hampered by crystallization.

After the residual heat strain of the produced low-melting glass composition was removed by heating the composition to a temperature within a range of $T_g$ to $M_g$ and then slowly cooling it, a prism of 4×4×15 mm was formed by the composition. The thermal expansion coefficient between 30 and 250° C., the glass transition temperature ($T_G$), and the deformation temperature ($A_T$) of the prism were measured by a thermal dilatometer. Herein, a heating rate was set to 5° C./min. Quartz glass having a cylinder shape of ϕ5×15 mm was used as a standard sample.

Figure 12:
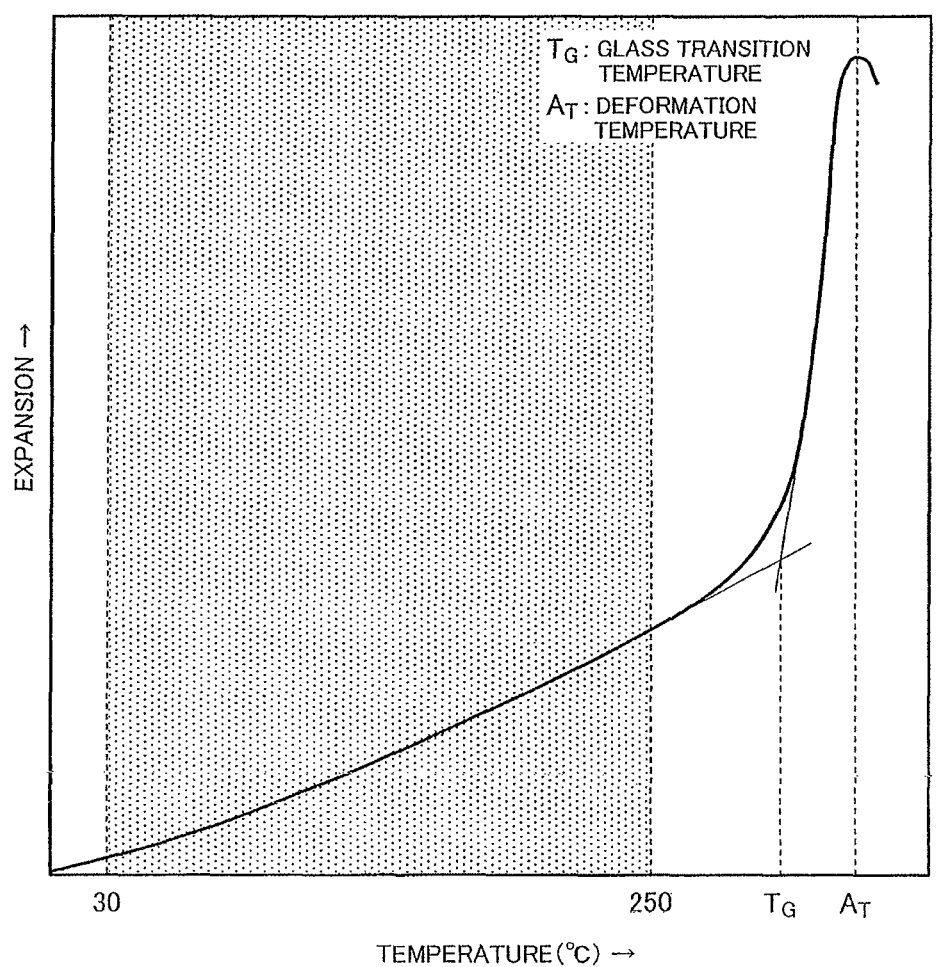
FIG. 12 is a graph showing a thermal expansion curve of a typical low-melting glass.

The thermal expansion curve of a typical low-melting glass composition is shown in FIG. 12. In FIG. 12, the expansion of the quartz glass, a standard sample, is deducted. The thermal expansion coefficient was calculated from the gradient of the expansions within a temperature range of 30 to 250° C. $T_G$ is a temperature at which expansion is significantly started, and $A_T$ is a temperature at which the glass is deformed by a weight. $T_G$ is almost the same as $T_g$ of the aforementioned DTA, and AT is an intermediate temperature between $M_g$ and $T_s$ of the DTA.

Figure 13:
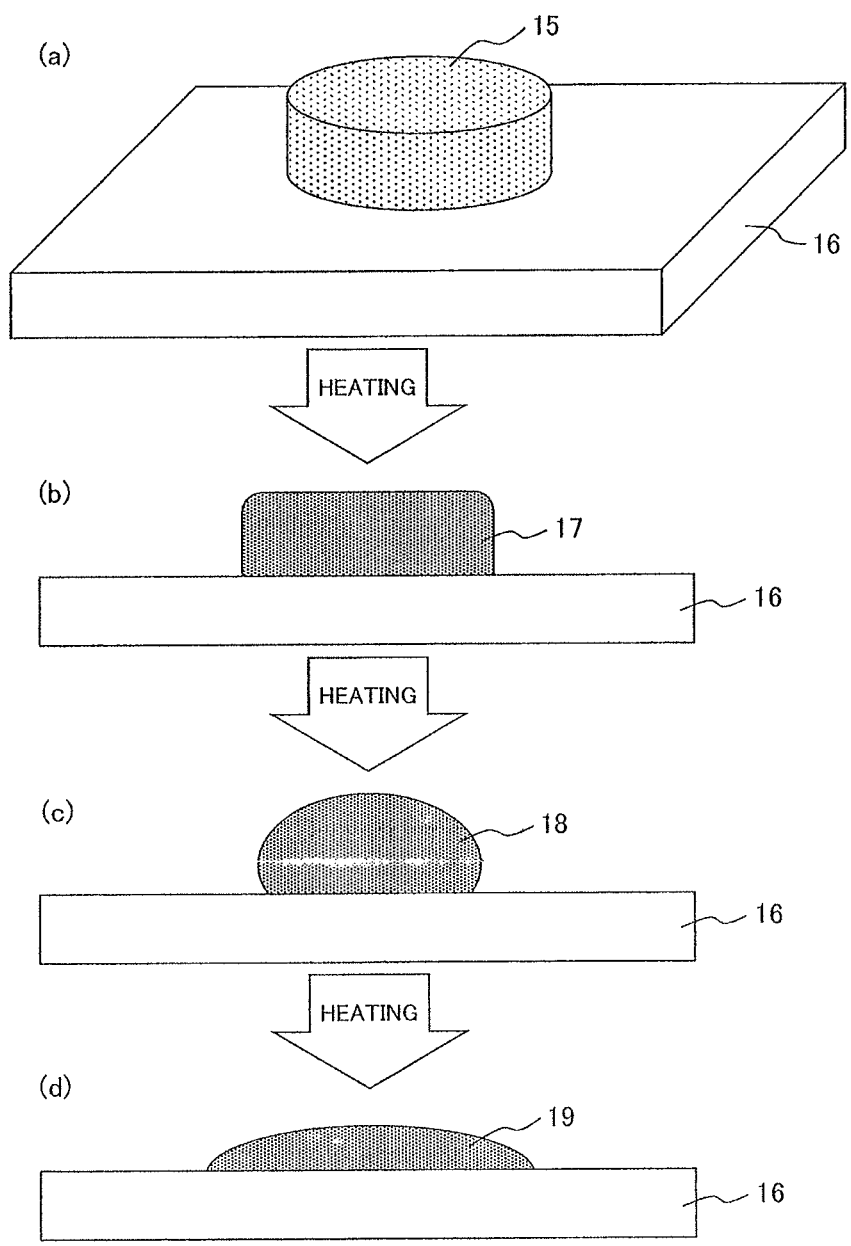
FIG. 13 is a schematic view illustrating shape changes occurring when a typical low-melting glass is heated.

The softening fluidity of the produced low-melting glass composition was evaluated by a button flow test. The aforementioned glass powders crushed by a ball mill were subjected to powder compression molding by a hand press (1 ton/cm²) so as to be formed into a cylinder shape of ϕ10×5 mm, and the softening fluidity thereof was determined by heating the formed cylinder on a soda-lime glass substrate and measuring the wet spread thereof. The formed cylinders were heated to 450° C., 470° C., and 490° C. at a heating rate of 10° C./minute and held for 30 minutes, respectively. The softening fluidity of a typical low-melting glass composition is shown in FIG. 13. (a) illustrates a state in which the glass powder compression molded body 15 before being heated is placed on the upper surface of a soda-lime glass substrate 16. When the molded body 15 is heated, the softening fluidity becomes better in the order of (b)→(c)→(d) as the heating temperature is higher. Herein, (b), (c), and (d) are schematic sectional views. If crystallization occurs in the middle of the course, softening fluidity may be suppressed or stopped even when the temperature is raised. Further, the surface of the glass may be devitrified. The softening fluidity was evaluated as follows: the softened state 17 illustrated in (b) was evaluated as "Δ"; the softened state 18 illustrated in (c) as "○"; and the softened state 19 illustrated in (d) as "⊙". When the molded body was not softened or was crystallized, it was evaluated as "x".

In the acid resistance test of the produced low-melting glass composition, a 1N nitric acid aqueous solution was used. As an evaluation sample, a sample having the same shape (4×4×15 mm) as that of the aforementioned thermal expansion evaluation sample was used. The weight of the sample was measured, and the sample was immersed in a 1N nitric acid aqueous solution at 50° C. for 10 minutes. The evaluation sample after being immersed was cleaned with pure water and an alcohol, and the weight thereof was again measured after being dried. The acid resistance was evaluated by calculating a weight reduction rate from the weights before and after the immersion. As the weight reduction rate is smaller, the sample is better in acid resistance.

Influence on environmental impact was determined by the presence or absence of environmentally regulated substances, such as lead, which were contained in the produced low-melting glass composition. When an environmentally regulated substance was not contained, the composition was evaluated as "○"; when contained as a major component, evaluated as "x"; and when contained as an accessory component, evaluated as "Δ".

The produced low-melting glass composition was comprehensively evaluated as follows: when the composition had at least one characteristic that was undesirable in the evaluations described above, the composition was evaluated as "x"; and when otherwise, evaluated as "○".

Each of Comparative Examples G49 and G50 shown in Table 5 is a typical PbO—$B_2O_3$-based low-melting glass that has been traditionally used for low-temperature airtight sealing. The melting points of these traditional glasses can be lowered by containing a large amount of PbO. However, lead (Pb) is an environmentally regulated substance and it is strongly required to be lead-free. Because the content of PbO in the low-melting glass of G49 was larger than that in G50, the density of G49 was larger, and $T_g$, $M_g$ and $T_s$, which are DTA characteristic temperatures, and $T_G$ and $A_T$, which are thermal expansion characteristic temperatures, were lower. Additionally, as the content of PbO was larger, influence on environmental impact became larger, but softening fluidity became better. As the content of PbO was smaller, a thermal expansion coefficient became smaller and more effective, the thermal expansion coefficient being near to that of the soda-lime glass to be used for a substrate in a heat-insulating member in a multilayer glass panel. The acid resistance of G49 and G50 was both poor, and in particular, as the content of PbO was larger, a weight reduction rate became significantly larger. Because the heat-resistant temperature of the soda-lime glass to be used as a substrate in a multilayer glass panel is approximately 500° C., airtight sealing is performed at a temperature of the temperature or lower. Because the softening fluidity of the low-melting glass of G50 is insufficient at a temperature of 500° C. or lower, it is difficult to adopt G50 for the airtight sealing of a multilayer glass panel using a soda-lime glass substrate. On the other hand, the softening fluidity of G49 containing a larger amount of PbO is good, and hence such a low-melting glass is currently used for the airtight sealing of a heat-insulating member.

Other Comparative Examples of G40 to G48 are lead-free low-melting glasses a major component of which is $V_2O_5$, as shown in Table 5. The densities of them were significantly smaller than those of the PbO—$B_2O_3$-based low-melting glass of G49 and G50. The softening fluidity of G41 and G43 was good at a temperature of 500° C. or lower, similarly to the PbO—$B_2O_3$-based low-melting glass of G49, but the acid resistance thereof was significantly poor. $T_g$, $M_g$ and $T_s$ of G42, G44, and G45, which are DTA characteristic temperatures, and $T_G$ and $A_T$ of them, which are thermal expansion characteristic temperatures, were low, but the softening fluidity of them was not good due to crystallization. Further, the acid resistance of G42, G44, and G45 was poor, similarly to the PbO—$B_2O_3$-based low-melting glass of G49 and G50. The acid resistance of G46 and G47 was better than that of the PbO—$B_2O_3$-based low-melting glass of G49 and G50, but $T_g$, $M_g$ and $T_s$ of G46 and G47, which are DTA characteristic temperatures, and $T_G$ and $A_T$ of them, which are thermal expansion characteristic temperatures, were high, and the softening fluidity of them was insufficient at a temperature of 500° C. or lower. The acid resistance of G48 was poor, similarly to the PbO—$B_2O_3$-based low-melting glass of G49 and G50.

Each of the softening fluidity at a temperature of 500° C. or lower, the acid resistance, and the influence on environmental impact of the $V_2O_5$—BaO—$P_2O_5$—$WO_3$-based low-melting glass of G1 to G40 shown in Tables 1 to 4 was better than that of the low-melting glass of G41 to G50 shown in Table 5. The densities of G1 to G40 were almost equal to those of Comparative Examples G1 to G48 and significantly smaller than those of the PbO—$B_2O_3$-based low-melting glass of G49 and G50. Additionally, $T_g$, $M_g$ and $T_s$ of Examples G1 to G40, which are DTA characteristic temperatures, and $T_G$ and $A_G$ of them, which are thermal expansion characteristic temperatures, were low and Examples G1 to G40 were hard to be crystallized, and hence the softening fluidity of them was good at a temperature of 500° C. or lower. Further, the acid resistance of Examples G1 to G40 was much better than that of the PbO—$B_2O_3$-based low-melting glass of G49 and G50. With respect to influence on environmental impact, Examples G1 to G40 were $V_2O_5$—BaO—$P_2O_3$—$WO_3$-based low-melting glasses not containing environmentally regulated substances, such as lead, and hence reductions in influence on environmental impact were much larger than that of the traditional PbO—$B_2O_3$-based low-melting glass.

The $V_2O_5$—BaO—$P_2O_3$—$WO_3$-based low-melting glass of Examples G1 to G40 was lead-free, similarly to Comparative Examples G41 to G48, each with the major component of $V_2O_5$, and it was intended that both the softening fluidity at a temperature of 500° C. or lower and the acid resistance of them was satisfied by examining in detail the components that form glass and the contents thereof. As a result of the detailed examination, it was found, as suggested from the compositions and characteristics of Examples G1 to G40, that both the softening fluidity and the acid resistance could be achieved by the low-melting glass containing a vanadium oxide, barium oxide, phosphorus oxide, and tungsten oxide in which the following two relational expressions were satisfied in terms of oxide contents: $V_2O_5+BaO+P_2O_5+WO_3$ 90 mol % and $V_2O_5>BaO>P_2O_5>WO_3$ (mol %). Further, it was effective that the low-melting glass contained, in terms of oxide contents, 35 to 47 mol % of $V_2O_5$, 20 to 35 mol % of BaO, 15 to 25 mol % of $P_2O_5$, and 3 to 13 mol % of $WO_3$. It was also found that one or more selected from the group consisting of $MoO_3$, $TeO_2$, SrO, ZnO, $K_2O$, and $Na_2O$ may be contained, in terms of oxide contents, in a total amount of 0 to 10 mol %.

Further, when 37 mol % $BaO+P_2O_5$ 55 mol % is satisfied, crystallization does not occur at a temperature of 550° C. or lower and $T_s$ is within a range of 396 to 446° C., and hence good softening fluidity was exhibited at a temperature of the heat-resistant temperature or lower of the soda-lime glass to be used for a substrate in a heat-insulating member, such as a multilayer glass panel. That is, it is said that airtight sealing can be performed at a temperature of 500° C. or lower. Further, when 42 mol % $V_2O_5+WO_3$ 55 mol % was satisfied in terms of oxide contents, a thermal expansion coefficient between 30 and 250° C. was (91 to 130)×$10^{-7}$/° C. In that case, crystallization is hard to occur, and hence a filler particle having a small thermal expansion coefficient can be easily contained. That is, with the low-melting glass of the present invention having a thermal expansion coefficient within this range, the thermal expansion coefficient thereof can be easily matched to that of a soda-lime glass substrate by containing the filler particles. Herein, the thermal expansion coefficient, between 30 and 250° C., of the soda-lime glass substrate was approximately 85×$10^{-7}$/° C.

As described above, in the low-melting glass of the present Examples, influence on environmental impact can be reduced, the softening fluidity at a temperature of 500° C. or lower and the acid resistance are good, and the thermal expansion can be reduced by containing filler particles; and hence the low-melting glass could be effectively developed into low-temperature airtight sealing of a heat-insulating member, such as a multilayer glass panel.

TABLE 1

| (Examples) Glass No. | | G1 | G2 | G3 | G4 | G5 | G6 | G7 | G8 | G9 | G10 |
|---|---|---|---|---|---|---|---|---|---|---|---|
| Composition (mol %) | $V_2O_5$ | 47 | 46 | 45 | 45 | 43 | 43 | 43 | 43 | 43 | 43 |
| | BaO | 24 | 23 | 25 | 22 | 21 | 35 | 30 | 25 | 25 | 22 |
| | $P_2O_5$ | 22 | 20 | 20 | 21 | 19 | 15 | 20 | 20 | 17 | 20 |
| | $WO_3$ | 7 | 6 | 10 | 7 | 5 | 7 | 7 | 7 | 5 | 5 |
| | $MoO_3$ | — | — | — | — | — | — | — | — | 5 | — |
| | $TeO_2$ | — | 5 | — | 5 | 10 | — | — | 5 | 5 | — |
| | SrO | — | — | — | — | — | — | — | — | — | 3 |
| | ZnO | — | — | — | — | — | — | — | — | — | 2 |
| | $K_2O$ | — | — | — | — | — | — | — | — | — | 5 |
| | $Na_2O$ | — | — | — | — | — | — | — | — | — | — |
| | Density (g/cm$^3$) | 3.63 | 3.77 | 3.68 | 3.83 | 3.89 | 3.98 | 3.86 | 3.82 | 3.85 | 3.70 |
| DTA Characteristic Temperatures (° C.) | Transition Point $T_g$ | 350 | 342 | 353 | 347 | 344 | 344 | 359 | 350 | 343 | 349 |
| | Yield Point $M_g$ | 378 | 368 | 381 | 374 | 367 | 365 | 380 | 382 | 375 | 366 |
| | Softening Point $T_s$ | 427 | 419 | 425 | 420 | 414 | 408 | 428 | 424 | 414 | 417 |
| | Crystallization Temperature $T_{cry}$ | >550 | >550 | >550 | >550 | >550 | >550 | >550 | >550 | >550 | >550 |
| Thermal Expansion Characteristic Temperatures (° C.) | Thermal Expansion Coefficient (×$10^{-7}$/° C.) | 94 | 97 | 91 | 99 | 112 | 119 | 110 | 107 | 113 | 126 |
| | Glass Transition Temperature $T_G$ | 353 | 345 | 357 | 349 | 346 | 346 | 361 | 353 | 345 | 351 |
| | Deformation Temperature $A_T$ | 397 | 384 | 399 | 387 | 380 | 391 | 399 | 392 | 385 | 390 |
| Softening Fluidity | 450° C.-30 Minutes | ○ | ◎ | ○ | ◎ | ◎ | ◎ | ○ | ◎ | ◎ | ◎ |
| | 470° C.-30 Minutes | ◎ | ◎ | ◎ | ◎ | ◎ | ◎ | ◎ | ◎ | ◎ | ◎ |
| | 490° C.-30 Minutes | ◎ | ◎ | ◎ | ◎ | ◎ | ◎ | ◎ | ◎ | ◎ | ◎ |
| Reliability (Acid Resistance) - Weight Reduction Rate (%) | | 3.8 | 2.2 | 3.3 | 2.0 | 1.6 | 4.5 | 4.1 | 3.3 | 3.1 | 4.9 |
| Influence on Environmental Impact | | ○ | ○ | ○ | ○ | ○ | ○ | ○ | ○ | ○ | ○ |
| Total Evaluation | | ○ | ○ | ○ | ○ | ○ | ○ | ○ | ○ | ○ | ○ |

TABLE 2

| (Examples) Glass No. | | G11 | G12 | G13 | G14 | G15 | G16 | G17 | G18 | G19 | G20 |
|---|---|---|---|---|---|---|---|---|---|---|---|
| Composition (mol %) | $V_2O_5$ | 42 | 42 | 42 | 42 | 42 | 42 | 42 | 42 | 42 | 42 |
| | BaO | 35 | 34 | 31 | 28 | 27 | 26 | 25 | 24 | 22 | 20 |
| | $P_2O_5$ | 15 | 17 | 20 | 23 | 18 | 20 | 15 | 19 | 20 | 18 |
| | $WO_3$ | 3 | 7 | 7 | 7 | 13 | 7 | 8 | 5 | 7 | 10 |
| | $MoO_3$ | — | — | — | — | — | — | — | — | 3 | — |
| | $TeO_2$ | 5 | — | — | — | — | 5 | 10 | 5 | — | 5 |
| | SrO | — | — | — | — | — | — | — | — | 4 | 5 |
| | ZnO | — | — | — | — | — | — | — | — | — | — |
| | $K_2O$ | — | — | — | — | — | — | — | 3 | 2 | — |
| | $Na_2O$ | — | — | — | — | — | — | — | 2 | — | — |
| | Density (g/cm$^3$) | 3.97 | 3.94 | 3.85 | 3.77 | 3.83 | 3.81 | 3.88 | 3.78 | 3.79 | 3.83 |
| DTA Characteristic Temperatures (° C.) | Transition Point $T_g$ | 340 | 352 | 362 | 371 | 368 | 348 | 332 | 330 | 335 | 345 |
| | Yield Point $M_g$ | 363 | 374 | 384 | 395 | 388 | 364 | 354 | 352 | 369 | 360 |
| | Softening Point $T_s$ | 405 | 419 | 433 | 446 | 434 | 421 | 396 | 407 | 410 | 419 |
| | Crystallization Temperature $T_{cry}$ | >550 | >550 | >550 | >550 | >550 | >550 | >550 | >550 | >550 | >550 |

TABLE 2-continued

| (Examples) Glass No. | | G11 | G12 | G13 | G14 | G15 | G16 | G17 | G18 | G19 | G20 |
|---|---|---|---|---|---|---|---|---|---|---|---|
| Thermal Expansion Coefficient ($\times 10^{-7}$/° C.) | | 123 | 115 | 109 | 101 | 97 | 108 | 120 | 126 | 124 | 105 |
| Thermal Expansion Characteristic Temperatures (° C.) | Glass Transition Temperature $T_G$ | 341 | 354 | 363 | 372 | 370 | 354 | 335 | 334 | 337 | 348 |
| | Deformation Temperature $A_T$ | 382 | 394 | 403 | 415 | 405 | 394 | 376 | 375 | 380 | 390 |
| Softening Fluidity | 450° C.-30 Minutes | ◎ | ◎ | ○ | ○ | ○ | ◎ | ◎ | ◎ | ◎ | ◎ |
| | 470° C.-30 Minutes | ◎ | ◎ | ◎ | ◎ | ◎ | ◎ | ◎ | ◎ | ◎ | ◎ |
| | 490° C.-30 Minutes | ◎ | ◎ | ◎ | ◎ | ◎ | ◎ | ◎ | ◎ | ◎ | ◎ |
| Reliability (Acid Resistance) - Weight Reduction Rate (%) | | 3.6 | 5.4 | 4.1 | 3.8 | 2.7 | 3.3 | 2.5 | 3.9 | 3.1 | 3.0 |
| Influence on Environmental Impact | | ○ | ○ | ○ | ○ | ○ | ○ | ○ | ○ | ○ | ○ |
| Total Evaluation | | ○ | ○ | ○ | ○ | ○ | ○ | ○ | ○ | ○ | ○ |

TABLE 3

| (Examples) Glass No. | | G21 | G22 | G23 | G24 | G25 | G26 | G27 | G28 | G29 | G30 |
|---|---|---|---|---|---|---|---|---|---|---|---|
| Composition (mol %) | $V_2O_5$ | 40 | 40 | 40 | 40 | 40 | 40 | 40 | 40 | 40 | 40 |
| | BaO | 35 | 34 | 33 | 30 | 30 | 28 | 27 | 25 | 25 | 22 |
| | $P_2O_5$ | 17 | 16 | 20 | 25 | 18 | 20 | 20 | 22 | 20 | 15 |
| | $WO_3$ | 8 | 10 | 7 | 5 | 7 | 7 | 7 | 3 | 5 | 13 |
| | $MoO_3$ | — | — | — | — | — | — | — | — | 5 | — |
| | $TeO_2$ | — | — | — | — | 5 | 5 | — | 5 | — | 10 |
| | SrO | — | — | — | — | — | — | — | — | 5 | — |
| | ZnO | — | — | — | — | — | — | — | 5 | — | — |
| | $K_2O$ | — | — | — | — | — | — | 3 | — | — | — |
| | $Na_2O$ | — | — | — | — | — | — | 3 | — | — | — |
| | Density (g/cm³) | 3.98 | 3.95 | 3.91 | 3.82 | 3.85 | 3.83 | 3.73 | 3.81 | 3.83 | 3.99 |
| DTA Characteristic Temperatures (° C.) | Transition Point $T_g$ | 355 | 352 | 360 | 370 | 351 | 355 | 333 | 355 | 365 | 341 |
| | Yield Point $M_g$ | 379 | 375 | 386 | 396 | 368 | 372 | 357 | 272 | 388 | 361 |
| | Softening Point $T_s$ | 428 | 423 | 431 | 446 | 422 | 428 | 417 | 429 | 436 | 405 |
| | Crystallization Temperature $T_{cry}$ | >550 | >550 | >550 | >550 | >550 | >550 | >550 | >550 | >550 | >550 |
| Thermal Expansion Coefficient ($\times 10^{-7}$/° C.) | | 118 | 114 | 104 | 97 | 100 | 108 | 123 | 111 | 106 | 115 |
| Thermal Expansion Characteristic Temperatures (° C.) | Glass Transition Temperature $T_G$ | 357 | 355 | 362 | 372 | 354 | 357 | 337 | 357 | 368 | 343 |
| | Deformation Temperature $A_T$ | 398 | 396 | 408 | 416 | 393 | 397 | 375 | 401 | 408 | 381 |
| Softening Fluidity | 450° C.-30 Minutes | ◎ | ◎ | ○ | ○ | ◎ | ◎ | ◎ | ◎ | ○ | ◎ |
| | 470° C.-30 Minutes | ◎ | ◎ | ◎ | ◎ | ◎ | ◎ | ◎ | ◎ | ◎ | ◎ |
| | 490° C.-30 Minutes | ◎ | ◎ | ◎ | ◎ | ◎ | ◎ | ◎ | ◎ | ◎ | ◎ |
| Reliability (Acid Resistance) - Weight Reduction Rate (%) | | 5.1 | 5.3 | 5.5 | 4.2 | 2.8 | 3.2 | 4.2 | 3.6 | 3.9 | 2.1 |
| Influence on Environmental Impact | | ○ | ○ | ○ | ○ | ○ | ○ | ○ | ○ | ○ | ○ |
| Total Evaluation | | ○ | ○ | ○ | ○ | ○ | ○ | ○ | ○ | ○ | ○ |

TABLE 4

| (Examples) Glass No. | | G31 | G32 | G33 | G34 | G35 | G36 | G37 | G38 | G39 | G40 |
|---|---|---|---|---|---|---|---|---|---|---|---|
| Composition (mol %) | $V_2O_5$ | 39 | 38 | 38 | 37 | 37 | 36 | 36 | 35 | 35 | 35 |
| | BaO | 34 | 28 | 25 | 35 | 26 | 31 | 25 | 30 | 26 | 25 |
| | $P_2O_5$ | 19 | 17 | 20 | 18 | 20 | 21 | 19 | 15 | 24 | 21 |
| | $WO_3$ | 8 | 7 | 10 | 10 | 7 | 7 | 10 | 10 | 7 | 11 |
| | $MoO_3$ | — | — | — | — | 3 | — | — | — | — | — |
| | $TeO_2$ | — | 4 | 7 | — | — | — | 7 | 10 | — | — |
| | SrO | — | — | — | — | 4 | — | — | — | — | — |
| | ZnO | — | 2 | — | — | — | — | — | — | — | — |
| | $K_2O$ | — | 2 | — | — | 3 | 5 | 3 | — | 8 | 8 |
| | $Na_2O$ | — | 2 | — | — | — | — | — | — | — | — |
| | Density (g/cm³) | 3.95 | 3.77 | 3.88 | 3.98 | 3.80 | 3.82 | 3.81 | 4.05 | 3.54 | 3.69 |
| DTA Characteristic Temperatures (° C.) | Transition Point $T_g$ | 357 | 353 | 365 | 367 | 364 | 356 | 354 | 356 | 362 | 355 |
| | Yield Point $M_g$ | 381 | 376 | 387 | 389 | 381 | 384 | 374 | 380 | 383 | 379 |
| | Softening Point $T_s$ | 430 | 426 | 441 | 438 | 428 | 430 | 425 | 427 | 433 | 428 |
| | Crystallization Temperature $T_{cry}$ | >550 | >550 | >550 | >550 | >550 | >550 | >550 | >550 | >550 | >550 |
| Thermal Expansion Coefficient ($\times 10^{-7}$/° C.) | | 108 | 120 | 105 | 117 | 122 | 128 | 123 | 119 | 130 | 125 |

TABLE 4-continued

| (Examples) Glass No. | | G31 | G32 | G33 | G34 | G35 | G36 | G37 | G38 | G39 | G40 |
|---|---|---|---|---|---|---|---|---|---|---|---|
| Thermal Expansion Characteristic Temperatures (° C.) | Glass Transition Temperature $T_G$ | 358 | 355 | 369 | 369 | 365 | 357 | 357 | 355 | 362 | 355 |
| | Deformation Temperature $A_T$ | 398 | 395 | 418 | 410 | 399 | 401 | 392 | 396 | 404 | 399 |
| Softening Fluidity | 450° C.-30 Minutes | ○ | ◎ | ○ | ○ | ◎ | ◎ | ◎ | ◎ | ◎ | ◎ |
| | 470° C.-30 Minutes | ◎ | ◎ | ◎ | ◎ | ◎ | ◎ | ◎ | ◎ | ◎ | ◎ |
| | 490° C.-30 Minutes | ◎ | ◎ | ◎ | ◎ | ◎ | ◎ | ◎ | ◎ | ◎ | ◎ |
| Reliability (Acid Resistance) - Weight Reduction Rate (%) | | 4.2 | 2.2 | 1.7 | 3.9 | 3.7 | 5.2 | 2.0 | 1.5 | 5.7 | 3.3 |
| Influence on Environmental Impact | | ○ | ○ | ○ | ○ | ○ | ○ | ○ | ○ | ○ | ○ |
| Total Evaluation | | ○ | ○ | ○ | ○ | ○ | ○ | ○ | ○ | ○ | ○ |

TABLE 5

| (Comparative Examples) Glass No. | | G41 | G42 | G43 | G44 | G45 | G46 | G47 | G48 | G49 | G50 |
|---|---|---|---|---|---|---|---|---|---|---|---|
| Composition (mol %) | $V_2O_5$ | 55 | 55 | 50 | 50 | 45 | 35 | 30 | 30 | — | — |
| | BaO | 15 | — | — | 12 | 10 | 25 | 35 | 15 | — | — |
| | $P_2O_5$ | 30 | 30 | 20 | 28 | 12 | 35 | 25 | 35 | 15 | — |
| | $WO_3$ | — | — | — | — | — | 5 | 10 | 10 | — | — |
| | $MoO_3$ | — | — | — | — | — | — | — | — | — | — |
| | $TeO_2$ | — | — | 30 | — | — | — | — | — | — | — |
| | SrO | — | — | — | — | — | — | — | — | — | — |
| | ZnO | — | 15 | — | — | 33 | — | — | 10 | 9 | 10 |
| | $K_2O$ | — | — | — | 5 | — | — | — | 3 | — | — |
| | $Na_2O$ | — | — | — | 5 | — | — | — | 2 | — | — |
| | PbO | — | — | — | — | — | — | — | — | 55 | 46 |
| | $B_2O_3$ | — | — | — | — | — | — | — | — | 27 | 25 |
| | $SiO_2$ | — | — | — | — | — | — | — | — | 7 | 12 |
| | $Al_2O_3$ | — | — | — | — | — | — | — | — | 2 | 7 |
| Density (g/cm³) | | 3.32 | 3.13 | 3.45 | 3.08 | 3.48 | 3.63 | 3.95 | 3.59 | 6.27 | 5.42 |
| DTA Characteristic Temperatures (° C.) | Transition Point $T_g$ | 338 | 305 | 299 | 311 | 333 | 405 | 395 | 362 | 340 | 372 |
| | Yield Point $M_g$ | 359 | 332 | 319 | 328 | 359 | 434 | 426 | 387 | 357 | 395 |
| | Softening Point $T_s$ | 415 | 394 | 378 | 371 | 414 | 492 | 473 | 449 | 412 | 467 |
| | Crystallization Temperature $T_{cry}$ | >550 | >550 | >550 | >550 | >550 | >550 | >550 | >550 | >550 | >550 |
| Thermal Expansion Coefficient ($\times 10^{-7}$/° C.) | | 95 | 88 | 107 | 148 | 85 | 91 | 110 | 106 | 101 | 90 |
| Thermal Expansion Characteristic Temperatures (° C.) | Glass Transition Temperature $T_G$ | 343 | 307 | 303 | 318 | 335 | 406 | 397 | 363 | 343 | 375 |
| | Deformation Temperature $A_T$ | 385 | 360 | 345 | 352 | 384 | 468 | 445 | 417 | 380 | 417 |
| Softening Fluidity | 450° C.-30 Minutes | ◎ | x crystallization | ◎ | x crystallization | x crystallization | x | x | x | ◎ | x |
| | 470° C.-30 Minutes | ◎ | x crystallization | ◎ | x crystallization | x crystallization | x | x | Δ | ◎ | x |
| | 490° C.-30 Minutes | ◎ | x crystallization | ◎ | x crystallization | x crystallization | x | Δ | ◎ | ◎ | Δ |
| Reliability (Acid Resistance) - Weight Reduction Rate (%) | | 38.5 | 45.8 | 33.6 | 43.7 | 17.2 | 9.8 | 2.6 | 22.3 | 30.1 | 13.7 |
| Influence on Environmental Impact | | ○ | ○ | ○ | ○ | ○ | ○ | ○ | ○ | x | x |
| Total Evaluation | | x | x | x | x | x | x | x | x | x | x |

EXAMPLE 2

In the present Example, two pieces of soda-lime glass were joined together by a sealing (joining) material including a low-melting glass and filler particles, so that the joined state was evaluated by shear stress. Two kinds of Examples G12 and G16 shown in Table 2 were used as the low-melting glass, and seven kinds shown in Table 6 were used as the filler particle. The low-melting glass of Examples G12 and G16 was crushed by a ball mill until the mean particle diameter thereof fell within a range of 10 to 25 μm, in the same way as that in Example 1. The mean particle diameters of the filler particles shown in Table 6 were within a range of 10 to 30 μm. Table 6 also shows both the densities and the thermal expansion coefficients, between 30 and 250° C., of these filler particles. Because the thermal expansion coefficients of these filler particles are sufficiently smaller than those of the low-melting glasses of Examples G1 to G40 shown in Tables 1 to 4, the thermal expansion coefficients can be matched to that of soda-lime glass by containing these filler particles in the sealing (joining) material.

Figure 14:
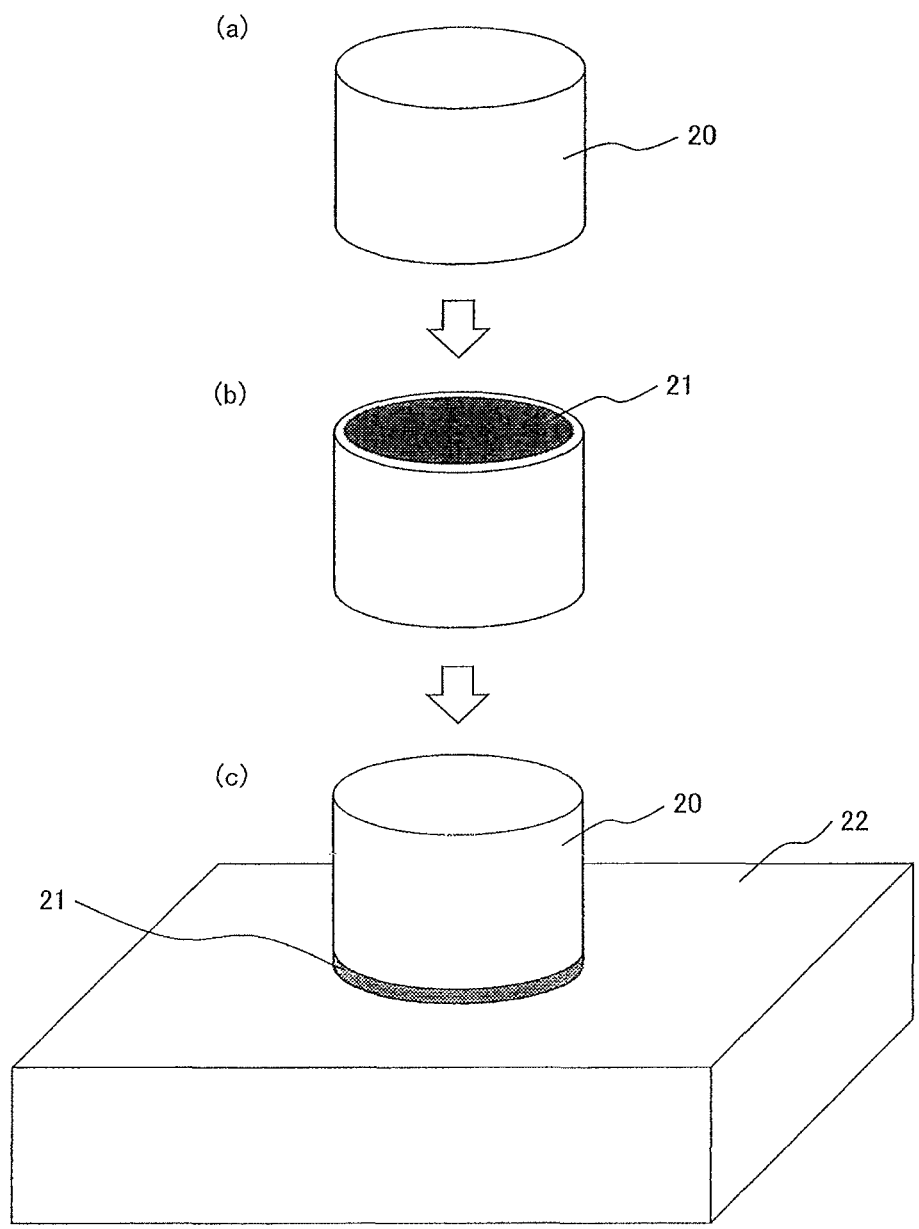
FIG. 14 is a schematic view illustrating a method of making a joined body for measuring shear stress.

A method of producing the joined body will be described. A method of producing the joined body is illustrated in FIG. 14. Cylinder solid-shaped soda-lime glass 20 of φ5×5 mm was provided (FIG. 14 (a)), and a sealing material paste was coated onto a joining surface by a dispenser method, which was then dried (FIG. 14 (b)). After the dried paste was heated, in the atmospheric air, to 400° C. at a heating rate of 5° C./minute and held for 30 minutes, it was further heated to 470° C. at the same heating rate and held for 30 minutes, thereby allowing a joining material 21 to be formed on the joining surface of the cylinder-shaped soda-lime glass 20. The soda-lime glass 20 was placed on a soda-lime glass substrate 22 having a thickness of 5 mm, and they were clipped by heat-resistant clips and heated, in the atmospheric air, to 470° C. at a heating rate of 5° C./minute and held for 30 minutes, thereby allowing the joined body to be produced (FIG. 14 (c)). Shear stress was measured in the joined body.

A joining material paste was produced by using the powder particles of the low-melting glass of Example G12 or G16, the filler particles shown in Table 6, a binder resin, and a solvent. The contents of the filler particles were set to 30, 50, and 60 parts by volume based on 100 parts by volume of the powder particles of the low-melting glass, respectively. Ethyl cellulose was used as the binder resin, and butylcarbitol acetate as the solvent.

The shear stress of the joined body was evaluated as follows: when 25 MPa or higher, evaluated as "⊚"; when 15 MPa or higher and smaller than 25 MPa, evaluated as "○"; when 5 MPa or higher and smaller than 15 MP, evaluated as "Δ"; and when smaller than 5 MPa, evaluated as "x". The results of evaluating the shear stress occurring when the low-melting glass of Example 12 was used are shown in Table 7, and those of evaluating the sheer stress occurring when the low-melting glass of Example G16 was used are show in Table 8. The results shown in Tables 7 and 8 are obtained by evaluating shear stress for the content of each of the filler particles based on the low-melting glass. When the content of any of the filler particles was 60 parts by volume, good shear stress was not obtained even if any one of the low-melting glass of Examples G12 and G16 was used. This is because, when the content of the filler particles was large based on that of the low-melting glass, the softening fluidity as the joining material became insufficient and hence good joint strength was not obtained.

When the content of the filler particles was 50 parts by volume or less, a good shear stress was obtained for every filler particle. The reason why the shear stress, obtained when the low-melting glass of Example G16 was used, was slightly better than that obtained when the low-melting glass of Example G12 was used is that the thermal expansion coefficient of G16 was smaller than that of G12. Additionally, the combination of any of the low-melting glass of G12 and G16 with the filler particle of F1 provided the best result of shear stress. It is thought that the best result was obtained because: the densities of the $V_2O_5$—BaO—$P_2O_5$—$WO_3$-based low-melting glass of the present invention and $Zr_2(WO_4)(PO_4)_2$ that is the filler particle of F1 are near to each other; the wettability of them are good to each other; and the filler particle makes it hard for the low-melting glass of the invention to be crystallized, in turn making the filler particles easy to be uniformly dispersed in the low-melting glass without deteriorating the softening fluidity of the low-melting glass.

Figure 15:
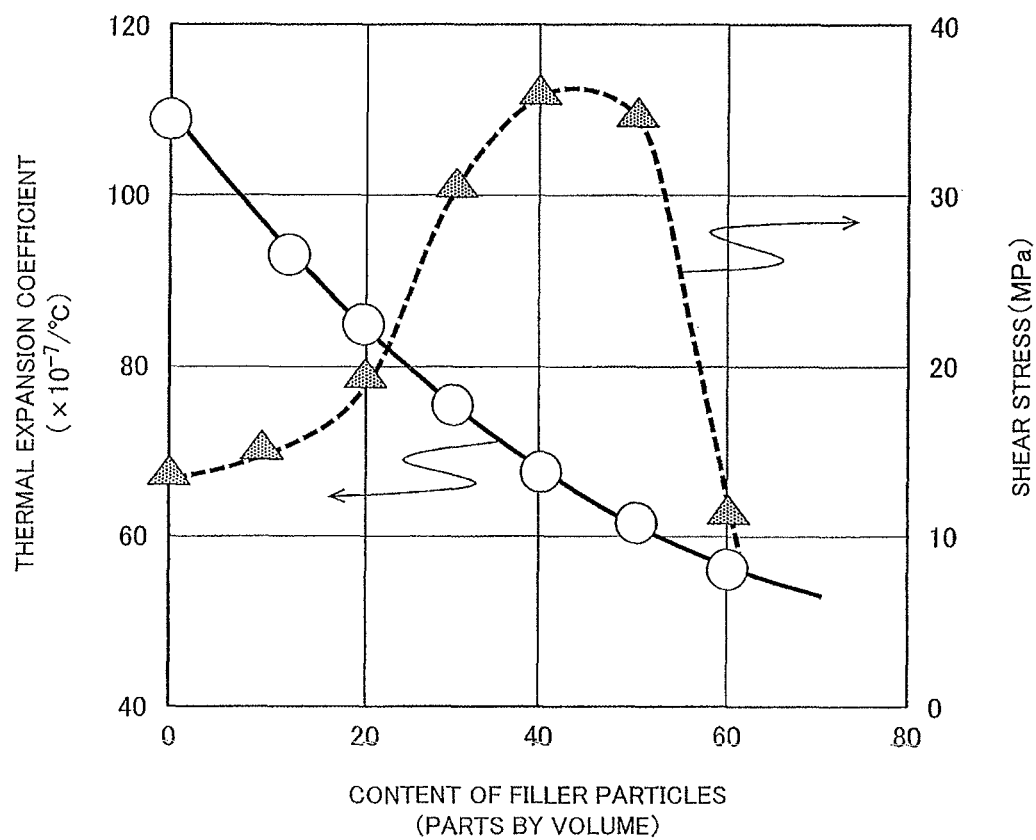
FIG. 15 is a graph showing the relationships among the content of filler particles in a sealing material, the thermal expansion coefficient of the sealing material, and the shear stress of a joined body joined by using the sealing material.

So, combinations of the low-melting glass of Example G16 with the filler particles of F1 were examined in detail. The relationships among the content of the filler particles of F1, the thermal expansion coefficient of a sealing material, and the shear stress of a joined body in which two pieces of soda-lime glass are joined together by a joining material using G16 and F1 are shown in FIG. 15. The joined body was produced by: blending and mixing certain amounts of the powder particles of the low-melting glass of Example G16 and the filler particles of F1; producing a powder compression molded body by a hand press; and baking the molded body at 450° C. for 30 minutes. The molded body was processed into a prism of 4×4×15 mm, and the thermal expansion coefficient thereof, between 30 and 250° C., was measured in the same way as that in Example 1. The shear stress of the joined body of soda-lime glass was evaluated by producing an evaluation sample in the same way as the method described with reference to FIG. 14.

As shown in FIG. 15, the thermal expansion coefficient of the sealing material was decreased with an increase in the amount of the filler particles, and became almost equal to the thermal expansion coefficient of the soda-lime glass when the amount was approximately 20 parts by volume. As shown in FIG. 15, the shear stress of the joined body of the two pieces of soda-lime glass was increased with an increase in the amount of the filler particles, became maximum at approximately 40 to 50 parts by volume, and was greatly decreased at 60 parts by volume. The decrease occurred because softening fluidity that was good as a sealing material was not obtained because of an excessive amount of the filler particles, as previously described. The increase in the shear stress of the joined body occurred because the thermal expansion coefficient was decreased by an increase in the amount of the filler particles, so that it could be matched to that of the soda-lime glass. In order to obtain good shear stress, it was effective that the thermal expansion coefficient of a joining material was within a range of $(60 \text{ to } 80) \times 10^{-7}$/° C. that is slightly smaller than the thermal expansion coefficient of soda-lime glass.

TABLE 6

| No. | Filler Particle | Density (g/cm³) | Thermal Expansion Coefficient ($\times 10^{-7}$/° C.) |
|---|---|---|---|
| F1 | $Zr_2(WO_4)(PO_4)_2$ | 3.8 | −32 |
| F2 | $LiAlSiO_4$ | 2.4 | −54 |
| F3 | $Mg_2Al_4Si_5O_{18}$ | 2.5 | 3 |
| F4 | $ZrSiO_4$ | 4.6 | 45 |
| F5 | $SiO_2$ | 2.2 | 5 |
| F6 | $Al_6Si_2O_{13}$ | 3.2 | 33 |
| F7 | $Nb_2O_5$ | 4.6 | 12 |

TABLE 7

| No. | 30 Parts by Volume | 50 Parts by Volume | 70 Parts by Volume |
|---|---|---|---|
| F1 | ⊚ | ⊚ | Δ |
| F2 | ⊚ | ○ | X |
| F3 | ○ | ○ | X |
| F4 | ○ | ○ | Δ |
| F5 | ○ | ⊚ | X |
| F6 | ○ | ○ | Δ |
| F7 | ○ | ○ | Δ |

TABLE 8

| No. | 30 Parts by Volume | 50 Parts by Volume | 70 Parts by Volume |
|---|---|---|---|
| F1 | ⊚ | ⊚ | Δ |
| F2 | ⊚ | ○ | X |
| F3 | ○ | ⊚ | X |
| F4 | ○ | ○ | Δ |
| F5 | ○ | ⊚ | X |

TABLE 8-continued

| No. | 30 Parts by Volume | 50 Parts by Volume | 70 Parts by Volume |
|-----|--------------------|--------------------|--------------------|
| F6  | ○                  | ○                  | Δ                  |
| F7  | ○                  | ◉                  | Δ                  |

EXAMPLE 3

In the present Example, the heat-insulating member illustrated in FIGS. 1A and 1B was produced by using a soda-lime glass substrate of 900×600×3 mm as each of the substrates 2 and 3. In order to set the distance between the substrates 2 and 3 to 500 μm, spherical beads 9 for spacer, each having a diameter of 500 μm, were contained in the airtight sealing part 1 and the spacer 7. The low-melting glass 5 of Example G12 shown in Table 2 and the filler particles 8 of F1 shown in Table 6 were used for the sealing material 6, and the content of the filler particles of F1 was set to 35 parts by volume based on 100 parts by volume of the low-melting glass of Example G12. Spherical beads were used as the spherical beads 9 for spacer to be contained in the sealing material 6, and 1 part by volume of the spherical beads was contained based on 100 parts by volume of the low-melting glass of Example G12 in the airtight sealing part 1, while 10 parts by volume of them were contained based on 100 parts by volume of the low-melting glass of Example G12 in the spacer 7. In order to produce a sealing material paste, ethyl cellulose was used as a binder resin and butylcarbitol acetate as a solvent.

As the heat-insulating member of the present Example, a multilayer glass panel was produced in accordance with the production method described with reference to FIGS. 3A to 5. A sealing material paste, containing 100 part by volume of the powder particles of the low-melting glass of Example G12, 35 part by volume of the filler particles of F1, and 1 part by volume of the spherical glass beads, was produced, and as shown in FIGS. 3A and 3B, it was coated onto the outer peripheral part of the soda-lime glass substrate by a dispenser method and dried. Similarly, a paste for spacer, containing 100 parts by volume of the powder particles of the low-melting glass of Example G12, 35 parts by volume of the filler particles of F1, and 10 parts by volume of the spherical glass beads, was produced, and it was coated onto the inner surface of the soda-lime glass substrate by a dispenser method and dried. After they were heated, in the atmospheric air, to 400° C. at a heating rate of 5° C./minute and held for 30 minutes, they were further heated to 470° C. at the same heating rate and held for 30 minutes, and the sealing material and the spacer were formed on the soda-lime glass substrate, as illustrated in FIGS. 3A and 3B. This soda-lime glass substrate and the other soda-lime substrate illustrated in FIGS. 4A and 4B, on which the heat ray reflective film 12 was formed, were faced each other, as illustrated in FIG. 5, followed by matching of their positions, and they were fixed by a plurality of heat-resistant clips. The fixed multilayer glass panel was airtightly sealed by vacuum-degassing, as illustrated in FIG. 5, the air therein according to the sealing temperature profile illustrated in FIG. 6.

In the sealing temperature profile, after the multilayer glass panel was heated, in the atmospheric air, to 410° C. at a heating rate of 5° C./minute and held for 30 minutes, it was further heated to 450° C. at a heating rate of 5° C./minute and held for 30 minutes, while the air inside the panel was being discharged from the exhaust hole 10 by a vacuum pump. During the step, the airtight sealing part 1 and the spacer 7 were crushed to be adhered to the two soda-lime substrates. Thereafter, the cap 11 was attached to the exhaust hole 10, thereby allowing a vacuum heat insulation multilayer glass panel as a heat-insulating member to be produced. In the present Example, ten vacuum heat insulation multilayer glass panels were produced.

In the present Example, the ten multilayer glass panels produced as heat-insulating members had neither breakage nor crack in visual inspection, and hence there was no problem. The distance between the soda-lime glass substrates became a uniform predetermined thickness due to the spherical glass beads in the sealing material and the spacer. That is, a multilayer glass panel having a predetermined space 4 was produced. Further, it was confirmed that the inside of the panel was in a vacuum state and the outer peripheral part of the panel was airtightly sealed.

In order to confirm the reliability of the airtight sealing part 1, the produced three multilayer glass panels were immersed in hot water at 50° C. for 30 days. It was confirmed that water did not enter the inside of each of the three panels and the inside was maintained to be in a vacuum state. Additionally, other three multilayer glass panels were tested, in which a heat cycle test between −50° C. and +100° C. was repeated 1000 times. Also in this test, the inside of each of the three panels was maintained to be in a vacuum state. From the facts described above, it was found that an airtight sealing part with high reliability could be obtained in the heat-insulating member of the present Example.

From the facts described above, it was confirmed that a heat-insulating member excellent in both a heat insulating property and reliability could be provided by using the low-melting glass of the present Example as a sealing material.

EXAMPLE 4

In the present Example, the heat-insulating member illustrated in FIGS. 1A and 1B was produced by using the low low-melting glass 5 of G17 whose softening point $T_s$ was the lowest in Examples of Tables 1 to 4, in the same way as that in Example 3. The distance between the substrates 2 and 3 in the heat-insulating member produced in the Example was set to 300 μm. Accordingly, the diameter of the spherical glass bead for spacer to be contained in the airtight sealing part 1 and the spacer 7 was set to 300 μm. A soda-lime glass substrate having the same size as that in Example 3 was used as the substrates 2 and 3. The content of the filler particles of F1 was set to 40 parts by volume based on 100 parts by volume of the low-melting glass of Example G17. In the sealing material 6, the spherical glass beads were contained in an amount of 0.1 parts by volume based on 100 parts by volume of the low-melting glass of Example G17, and in the spacer 7, contained in an amount of 5 parts by volume based on 100 parts by volume of the low-melting glass of Example G17. In order to produce a sealing material paste, ethyl cellulose was used as a binder resin, and butylcarbitol acetate as a solvent.

A sealing material paste, containing 100 parts by volume of the powder particles of the low-melting glass of Example G17, 40 parts by volume of the filler particles of F1, and 0.1 parts by volume of the spherical glass beads, was produced, and it was coated onto the outer peripheral part of the soda-lime glass substrate by a dispenser method, as illustrated in FIGS. 3A and 3B, and dried. Similarly, a paste for spacer, containing 100 parts by volume of the powder particles of the low-melting glass of Example G17, 40 parts by volume of the filler particles of F1, and 5 parts by volume of the spherical glass beads, was produced, and it was coated onto the inner surface of the soda-lime glass substrate by a dispenser method and then dried. After they were heated, in the atmospheric air, to 390° C. at a heating rate of 5° C./minute and held for 30 minutes, they were further heated to 440° C. at the same heating rate and held for 30 minutes, and the sealing material and the spacer were formed on the soda-lime glass substrate, as illustrated in FIGS. 3A and 3B. This soda-lime glass substrate and the other soda-lime substrate illustrated in FIGS. 4A and 4B, on which the heat ray reflective film 12 was formed, were faced each other, as illustrated in FIG. 5, followed by matching of their positions, and they were fixed by a plurality of heat-resistant clips. The fixed multilayer glass panel was airtightly sealed by vacuum-degassing, as illustrated in FIG. 5, the air therein according to the sealing temperature profile illustrated in FIG. 6.

In the sealing temperature profile, after the multilayer glass panel was heated, in the atmospheric air, to 390° C. at a heating rate of 5° C./minute and held for 30 minutes, it was further heated to 420° C. at a heating rate of 5° C./minute and held for 30 minutes, while the air inside the panel was being discharged from the exhaust hole 10 by a vacuum pump. During the step, the airtight sealing part 1 and the spacer 7 were crushed to be adhered to the two soda-lime substrates. Thereafter, the cap 11 was attached to the exhaust hole 10, thereby allowing a vacuum heat insulation multilayer glass panel as a heat-insulating member to be produced. Also, in the present Example, ten vacuum heat insulation multilayer glass panels were produced similarly in Example 3.

Also, in the ten heat-insulating members produced in the present Example, the effectiveness of each of the heat-insulating member and the low-melting glass was confirmed similarly in Example 3.

EXAMPLE 5

In the present Example, ten of the heat-insulating members illustrated in FIGS. 1A and 1B, each with the space 4 inside the multilayer glass panel in a reduced pressure state under an argon atmosphere, were produced by using the sealing material 6 containing the low-melting glass 5 of G24, having the highest softening point $T_s$ among the Examples of Tables 1 to 4, so that they were evaluated in the same way as that in Example 3. A soda-lime glass substrate of 900×600×5 mm was used are each of the substrates 2 and 3, and the distance between the substrates 2 and 3 was set to 500 μm by setting the diameter of a spherical glass bead for spacer to 500 μm, the spherical glass bead being contained in the sealing material 6 and the spacer 7. Because vacuum degassing is not performed in the present Example, it is unnecessary to provide the exhaust hole 10 in the substrate 3. The filler particles of F1 in Table 6 were used as the filler particles 8 to be contained in the sealing material 6, similarly in Example 3, and the content thereof was set to 20 parts by volume based on 100 parts by volume of the low-melting glass of Example G24. Further, the content of the spherical glass beads was set, in the airtight sealing part 1, to 0.3 parts by volume based on 100 parts by volume of the low-melting glass of Example G24, and in the spacer 7, to 3 parts by volume based thereon. In order to produce a sealing material paste, ethyl cellulose was used as a binder resin, and butylcarbitol acetate as a solvent.

A sealing material paste, containing 100 parts by volume of the powder particles of the low-melting glass of Example G24, 20 parts by volume of the filler particles of F1, and 0.3 parts by volume of the spherical glass beads, was produced, and it was coated onto the outer peripheral part of the soda-lime glass substrate by a dispenser method, as illustrated in FIGS. 3A and 3B, and dried. Similarly, a paste for spacer, containing 100 parts by volume of the powder particles of the low-melting glass of Example G24, 20 parts by volume of the filler particles of F1, and 3 parts by volume of the spherical glass beads, was produced, and it was coated onto the inner surface of the soda-lime glass substrate by a dispenser method and then dried. After they were heated, in the atmospheric air, to 440° C. at a heating rate of 5° C./minute and held for 30 minutes, they were further heated to 480° C. at the same heating rate and held for 30 minutes, and the sealing material and the spacer were formed on the soda-lime glass substrate, as illustrated in FIGS. 3A and 3B. This soda-lime glass substrate and the other soda-lime substrate illustrated in FIGS. 4A and 4B, on which the heat ray reflective film 12 was formed, were faced each other, as illustrated in FIG. 5, followed by matching of their positions, and they were fixed by a plurality of heat-resistant clips. The multilayer glass panel was placed in a baking furnace, and a weight for crushing the spacer 7 to a predetermined thickness was put at the center of the panel. After the air inside the furnace was discharged by a vacuum pump, argon gas was introduced therein. Thereafter, the panel was heated, in argon, to 450° C. at a heating rate of 5° C./minute and held for 30 minutes, and it was further heated to 500° C. at the same heating rate and held for 30 minutes, thereby allowing the airtight sealing part 1 and the spacer 7 to be adhered to the two soda-lime substrates. Thereafter, by cooling the panel, ten multilayer glass panels, each with the space 3 inside in a reduced pressure state under argon atmosphere, were produced as heat-insulating members.

Also, in the ten heat-insulating members produced in the present Example, the effectiveness of each of the heat-insulating member and the low-melting glass was confirmed similarly in Example 3.

EXAMPLE 6

In the present Example, ten heat-insulating members illustrated in FIGS. 2A and 2B were produced by using: a soda-lime glass substrates of 900×600×3 mm as each of the substrates 2 and 3; soda-lime glass square bars of 880×10×5 mm and 580×10×5 mm as the square bar 13; and a soda-lime glass cylinder of ϕ5×5 mm as the cylinder 14, in which the distance between the substrates 2 and 3 was set to approximately 5 mm. The low-melting glass 5 of Example G3 shown in Table 1 and the filler particles 8 of F1 shown in Table 6 were used for the sealing materials 6 and 6' to be formed on the square bar 13 and the cylinder 14, and the content of the filler particles of F1 was set to 20 parts by volume based on 100 parts by volume of the low-melting glass of Example G3. In order to produce the sealing material paste, ethyl cellulose was used as a binder resin, and butylcarbitol acetate as a solvent.

As the heat-insulating member of the present Example, a multilayer glass panel, in which the distance between the substrates 2 and 3 was large, was produced in accordance with the production method described with reference to FIGS. 7A to 11. A sealing material paste, containing 100 parts by volume of the powder particles of the low-melting glass of Example G3 and 20 parts by volume of the filler particles of F1, was produced, and it was coated onto the square bar 13 and the cylinder 14, as illustrated in FIGS. 7A to 8B, and dried. After they were placed into a baking furnace and heated, in the atmospheric air, to 420° C. at a heating rate of 5° C./minute and held for 30 minutes, they were further heated to 470° C. at the same heating rate and held for 30 minutes, thereby allowing the sealing materials 6 and 6' to be formed on the square bar 13 and the cylinder 14, as illustrated in FIGS. 7A to 8B. They were arranged and installed on a soda-lime substrate on which the heat ray reflective film 12 was formed, as illustrated in FIG. 9.

Subsequently, a soda-lime substrate, in which the exhaust hole 10 was formed, was placed thereon, as illustrated in FIG. 10, and the outer peripheral part of them was fixed by a plurality of heat-resistant clips. The fixed multilayer glass panel was airtightly sealed by vacuum-degassing, as illustrated in FIG. 10, the air therein according to the sealing temperature profile illustrated in FIG. 6. In the sealing temperature profile, after the multilayer glass panel was heated, in the atmospheric air, to 425° C. at a heating rate of 5° C./minute and held for 30 minutes, it was further heated to 450° C. at a heating rate of 5° C./minute and held for 30 minutes, while the air inside the panel was being discharged from the exhaust hole 10 by a vacuum pump. During the step, the sealing materials 6 and 6' were adhered to the two soda-lime substrates. Thereafter, the cap 11 was attached to the exhaust hole 10, thereby allowing ten vacuum heat insulation multilayer glass panels as heat-insulating members to be produced.

Also, the ten heat-insulating members produced in the present Example were evaluated in the same way as that in Example 3. Even when the distance between the substrates and the space 4 were both large, the effectiveness of each of the heat-insulating member and the low-melting glass was also confirmed similarly in Example 3.

EXAMPLE 7

In the present Example, ten heat-insulating members illustrated in FIGS. 2A and 2B, the space 4 inside a multilayer glass panel being in a reduced pressure state under argon atmosphere, were produced by using the sealing material 6 containing the low-melting glass 5 of Example G38 shown in Table 4, so that they were evaluated in the same way as those in Examples 3 and 6. The distance between the substrates 2 and 3 was set to approximately 5 mm by using: a soda-lime glass substrate of 900×600×5 mm as each of the substrates 2 and 3; soda-lime glass square bars of 880×10×5 mm and 580×10×5 mm as the square bar 13; and a soda-lime glass cylinder of ϕ5×5 mm as the cylinder 14. Because vacuum degassing is not performed in the present Example, it is unnecessary to provide the exhaust hole 10 in the substrate 3. The filler particles of F1 in Table 6 were used as the filler particles 8 to be contained in the sealing materials 6 and 6', similarly in Example 6, and the content thereof was set to 40 parts by volume based on 100 parts by volume of the low-melting glass of Example G38. In order to produce a sealing material paste, ethyl cellulose was used as a binder resin, and butylcarbitol acetate as a solvent.

As a heat-insulating member of the present Example, a multilayer glass panel, in which the distance between the substrates 2 and 3 was large, was produced in accordance with the production method described with reference to FIGS. 7A to 11. A sealing material paste, containing 100 parts by volume of the powder particles of the low-melting glass of Example G38 and 40 parts by volume of the filler particles of F1, was produced, and it was coated onto the square bar 13 and the cylinder 14, as illustrated in FIGS. 7A to 8B, and dried. After they were placed into a baking furnace and heated, in the atmospheric air, to 420° C. at a heating rate of 5° C./minute and held for 30 minutes, they were further heated to 470° C. at the same heating rate and held for 30 minutes, thereby allowing the sealing materials 6 and 6' to be formed on the square bar 13 and the cylinder 14, as illustrated in FIGS. 7A to 8B. They were arranged and installed on a soda-lime substrate on which the heat ray reflective film 12 was formed, as illustrated in FIG. 9.

Subsequently, a soda-lime substrate without the exhaust hole 10 was placed thereon, as illustrated in FIG. 10, and the outer peripheral part of them was fixed by a plurality of heat-resistant clips. The fixed multilayer glass panel was placed in a baking furnace, and a weight was put at the center of the panel. After the air inside the furnace was discharged by a vacuum pump, argon gas was introduced therein. Thereafter, the panel was heated, in argon, to 430° C. at a heating rate of 5° C./minute and held for 30 minutes, and it was further heated to 490° C. at the same heating rate and held for 30 minutes, thereby allowing the airtight sealing part 1 and the spacer 7 to be adhered to the two soda-lime substrates. Thereafter, by cooling the panel, ten multilayer glass panels, each with the space 3 inside in a reduced pressure state under argon atmosphere, were produced as heat-insulating members.

Also, in the ten heat-insulating members produced in the present Example, the effectiveness of each of the heat-insulating member and the low-melting glass was confirmed similarly in Examples 3 and 6.

LIST OF REFERENCE SIGNS

1: AIRTIGHT SEALING PART
2, 3: SUBSTRATE
4: SPACE
5: LOW-MELTING GLASS
6, 6': SEALING MATERIAL
7: SPACER
8: FILLER PARTICLE
9: SPHERICAL BEAD FOR SPACER OR SPHERICAL GLASS BEAD FOR SPACER
10: EXHAUST HOLE
11: CAP
12: HEAT RAY REFLECTIVE FILM
13: SQUARE BAR
14: PRISM OR CYLINDER SOLID
15: GLASS POWDER COMPRESSION MOLDED BODY
16: SODA-LIME GLASS SUBSTRATE
17: SOFTENED STATE
18: FLUIDIZED STATE
19: GOOD FLUIDIZED STATE
20: CYLINDER SOLID-SHAPED SODA-LIME GLASS
21: JOINING MATERIAL
22: SODA-LIME GLASS SUBSTRATE.

The invention claimed is:

1. A heat-insulating member comprising:
a pair of substrates; and
an airtight sealing part,
wherein the airtight sealing part is formed in an outer peripheral part between the pair of substrates, a space being formed between the pair of substrates, the space being in a vacuum or reduced pressure state,
a sealing material that forms the airtight sealing part includes a low-melting glass composition comprising:
vanadium oxide;
barium oxide;

phosphorus oxide;
tungsten oxide; and
at least one additional oxide selected from the group consisting of $TeO_2$, SrO, ZnO, $K_2O$ and $Na_2O$,
wherein the low-melting glass composition contains, in terms of oxide contents, 35 to 47 mol % of $V_2O_5$, in which the following relational expressions are satisfied:
the mol % of $V_2O_5$+the mol % of BaO+the mol % of $P_2O_5$+the mol % of $WO_3 \geq 90$ mol %; and
the mol % of $V_2O_5$>the mol % of BaO>the mol % of $P_2O_5$>the mol % of $WO_3$.

2. The heat-insulating member according to claim 1, wherein a spacer is arranged in the space.

3. The heat-insulating member according to claim 1, wherein the pair of substrates are made of a glass.

4. The heat-insulating member according to claim 1, wherein the low-melting glass contains, in terms of oxide contents, 35 to 47 mol % of $V_2O_5$, 20 to 35 mol % of BaO, 15 to 25 mol % of $P_2O_5$, and 3 to 13 mol % of $WO_3$.

5. The heat-insulating member according to claim 1, wherein the low-melting glass further contains one or more selected from the group consisting of Mo, Te, Sr, Zn, K, and Na, and a total amount of them is 10 mol % or less in terms of oxide contents.

6. The heat-insulating member according to claim 1, wherein the low-melting glass satisfies the following relational expression in terms of oxide contents:

37 mol % ≤ the mol % of BaO+the mol % of $P_2O_5$ ≤ 55 mol %.

7. The heat-insulating member according to claim 1, wherein the low-melting glass satisfies the following relational expression in terms of oxide contents:

42 mol % ≤ the mol % of $V_2O_5$+the mol % of $WO_3$ ≤ 55 mol %.

8. The heat-insulating member according to claim 1, wherein the sealing material contains a filler particle, the filler particle has a thermal expansion coefficient smaller than that of the low-melting glass, and a content of the filler particle is 50 parts by volume or less based on 100 parts by volume of the low-melting glass.

9. The heat-insulating member according to claim 8, wherein the filler particle is one or more selected from the group consisting of $Zr_2(WO_4)(PO_4)_2$, $LiAlSiO_4$, $Mg_2Al_4Si_5O_{18}$, $ZrSiO_4$, an $SiO_2$ glass, $Al_6Si_2O_{13}$, and $Nb_2O_5$.

10. The heat-insulating member according to claim 1, wherein the sealing material further contains a spherical bead for a spacer.

11. The heat-insulating member according to claim 1 that is airtightly sealed at a temperature of 420 to 500° C. by using the sealing material.

12. A low-melting glass composition comprising:
vanadium oxide;
barium oxide;
phosphorus oxide;
tungsten oxide; and
at least one additional oxide selected from the group consisting of $TeO_2$, SrO, ZnO, $K_2O$ and $Na_2O$,
wherein the low-melting glass composition contains in terms of oxide contents, 35 to 47 mol % of $V_2O_5$, in which the following relational expressions are satisfied:

the mol % of $V_2O_5$+the mol % of BaO+the mol % of $P_2O_5$+the mol % of $WO_3 \geq 90$ mole %; and the mol % of $V_2O_5$>the mol % of BaO>the mol % of $P_2O_5$>the mol % of $WO_3$.

13. The low-melting glass composition according to claim 12, containing, in terms of oxide contents, 20 to 35 mol % of BaO, 15 to 25 mol % of $P_2O_5$, and 3 to 13 mol % of $WO_3$.

14. The low-melting glass composition according to claim 12, further containing one or more selected from the group consisting of Mo, Te, Sr, Zn, K, and Na, in which a total amount of them is 10 mol % or less in terms of oxide contents.

15. The low-melting glass composition according to claim 12, wherein the following relational expression is satisfied in terms of oxide contents:

37 mol % ≤ the mol % of BaO+the mol % of $P_2O_5$ ≤ 55 mol %.

16. The low-melting glass composition according to claim 12, wherein the following relational expression is satisfied in terms of oxide contents:

37 mol % to 42 mol % ≤ the mol % of $V_2O_5$+the mol % of $WO_3$ ≤ 55 mol %.

17. A sealing material paste containing:
a powder particle of the low-melting glass composition according to claim 12; and
a filler particle having a thermal expansion coefficient smaller than that of the low-melting glass composition,
wherein a content of the filler particle is 50 parts by volume or less based on 100 parts by volume of the low-melting glass composition.

18. The sealing material paste according to claim 17, wherein the filler particle is one or more selected from the group consisting of $Zr_2(WO_4)(PO_4)_2$, $LiAlSiO_4$, $Mg_2Al_4Si_5O_{18}$, $ZrSiO_4$, an $SiO_2$ glass, $Al_6Si_2O_{13}$, and $Nb_2O_5$.

19. The sealing material paste according to claim 17, further containing a spherical glass bead for a spacer.

20. The sealing material paste according to claim 19, wherein a content of the spherical glass bead is 1 part by volume or less based on 100 parts by volume of the low-melting glass composition.

21. The heat-insulating member according to claim 1, wherein a softening point of the low-melting glass is less than or equal to 446° C.

* * * * *